United States Patent [19]

Ishiguro et al.

[11] Patent Number: 5,446,796

[45] Date of Patent: Aug. 29, 1995

[54] METHOD AND APPARATUS FOR SETTLEMENT OF ACCOUNTS BY IC CARDS

[75] Inventors: Ginya Ishiguro; Toshiyasu Muta; Kazutaka Sakita, all of Yokosuka; Shoji Miyaguchi, Yokohama; Tatsuaki Okamoto, Yokosuka; Atsushi Fujioka, Yokohama, all of Japan

[73] Assignee: Nippon Telegraph and Telephone Corporation, Tokyo, Japan

[21] Appl. No.: 331,735

[22] Filed: Oct. 31, 1994

Related U.S. Application Data

[62] Division of Ser. No. 119,850, Sep. 13, 1993, Pat. No. 5,396,558.

[30] Foreign Application Priority Data

| Sep. 18, 1992 | [JP] | Japan | 4-249293 |
| Sep. 18, 1992 | [JP] | Japan | 4-249294 |
| Nov. 18, 1992 | [JP] | Japan | 4-308688 |
| Nov. 26, 1992 | [JP] | Japan | 4-317254 |
| Nov. 26, 1992 | [JP] | Japan | 4-317255 |

[51] Int. Cl.⁶ .................................................. H04L 9/30
[52] U.S. Cl. ............................................ 380/24; 380/25; 380/30
[58] Field of Search ............................. 380/24, 25, 30; 235/380

[56] References Cited

U.S. PATENT DOCUMENTS

| 4,438,824 | 3/1984 | Mueller-Schloer | 380/30 |
| 4,723,284 | 2/1988 | Munck et al. | 380/25 |
| 4,758,718 | 7/1988 | Fujisaki et al. | 235/380 |
| 4,807,288 | 2/1989 | Ugon et al. | 380/30 |
| 4,862,501 | 8/1989 | Kamitake et al. | 380/25 |
| 4,885,777 | 12/1989 | Takaragi et al. | 380/30 |
| 4,885,788 | 12/1989 | Takaragi et al. | 380/25 |
| 4,969,189 | 11/1990 | Ohta e tal. | 380/25 |
| 5,016,276 | 5/1991 | Matumoto et al. | 380/25 |
| 5,018,196 | 5/1991 | Takaragi et al. | 380/30 |
| 5,046,094 | 9/1991 | Kawamura et al. | 380/30 |
| 5,119,070 | 3/1993 | Matsuzaki et al. | 380/30 |
| 5,267,149 | 11/1993 | Anada et al. | 235/380 |
| 5,396,558 | 3/1995 | Ishiguro et al. | 380/25 |

*Primary Examiner*—Salvatore Cangialosi
*Attorney, Agent, or Firm*—Pollock, VandeSande and Priddy

[57] ABSTRACT

An IC card has a card information memory area wherein there are written a master public key nA, card secret keys pU and qU, a card public key nU, a card identification number IDU, and a first master digital signature SA1 for information including the card identification number. An IC card terminal has terminal information memory area wherein there are written a master public key nA, terminal secret keys pT and qT, a terminal public key nT, a terminal identification number IDT, and a second master digital signature SA2 for information including the terminal identification number IDT. When inserted into the IC card terminal, the IC card sends thereto the data nU, IDU, and SA1. The IC card terminal verifies the digital signature SA1 by the master public key nA and, if it is valid, transmits the data nT, IDT and SA2 to the IC card. The IC card verifies the digital signature SA2 by the master public key nA and, if it is valid, transmits information corresponding to the current remainder value V to the IC card terminal. The IC card terminal makes a check to see if the received information corresponding to the remainder value V is appropriate, and if so, becomes enabled for providing a service.

4 Claims, 16 Drawing Sheets

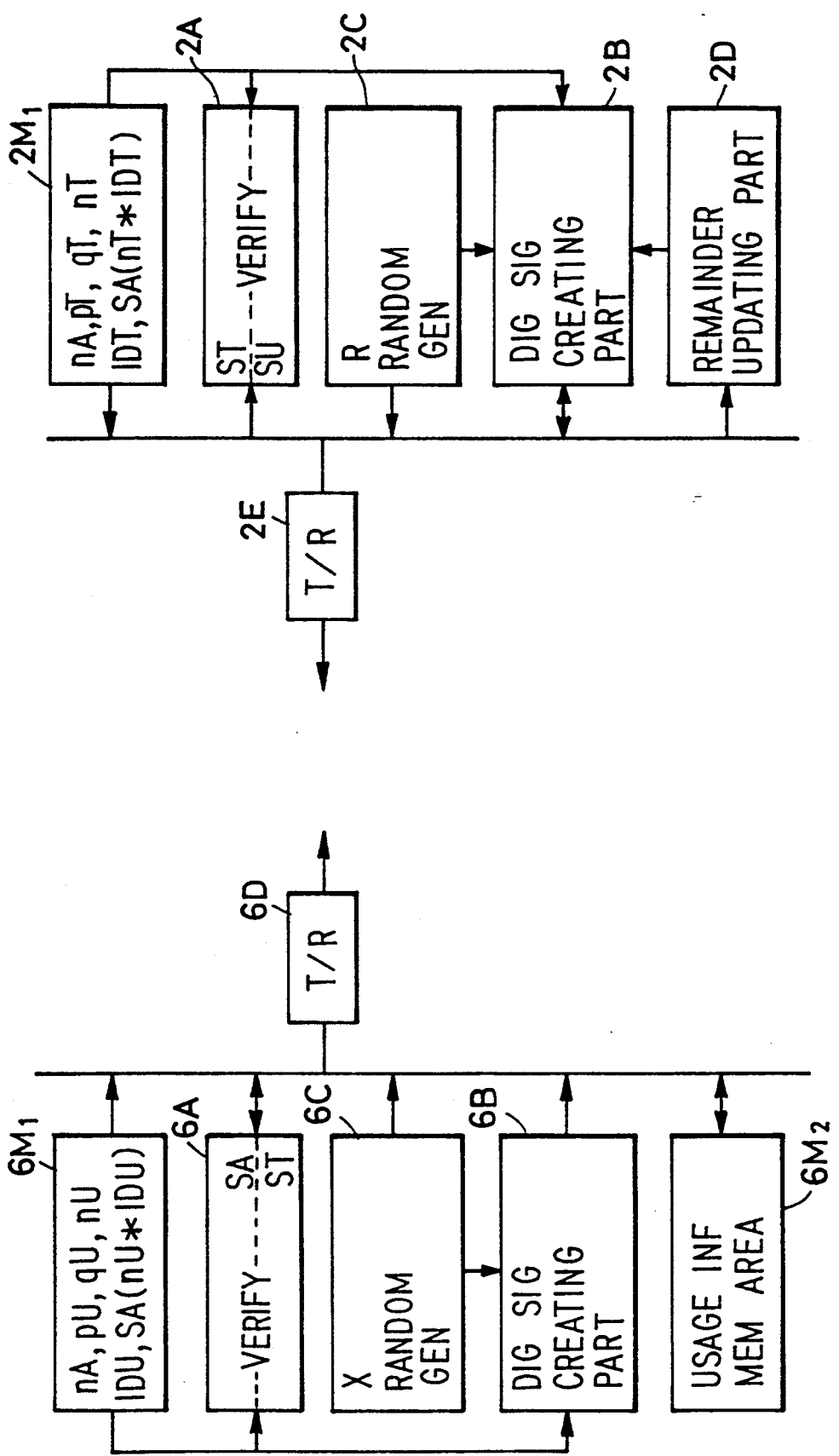

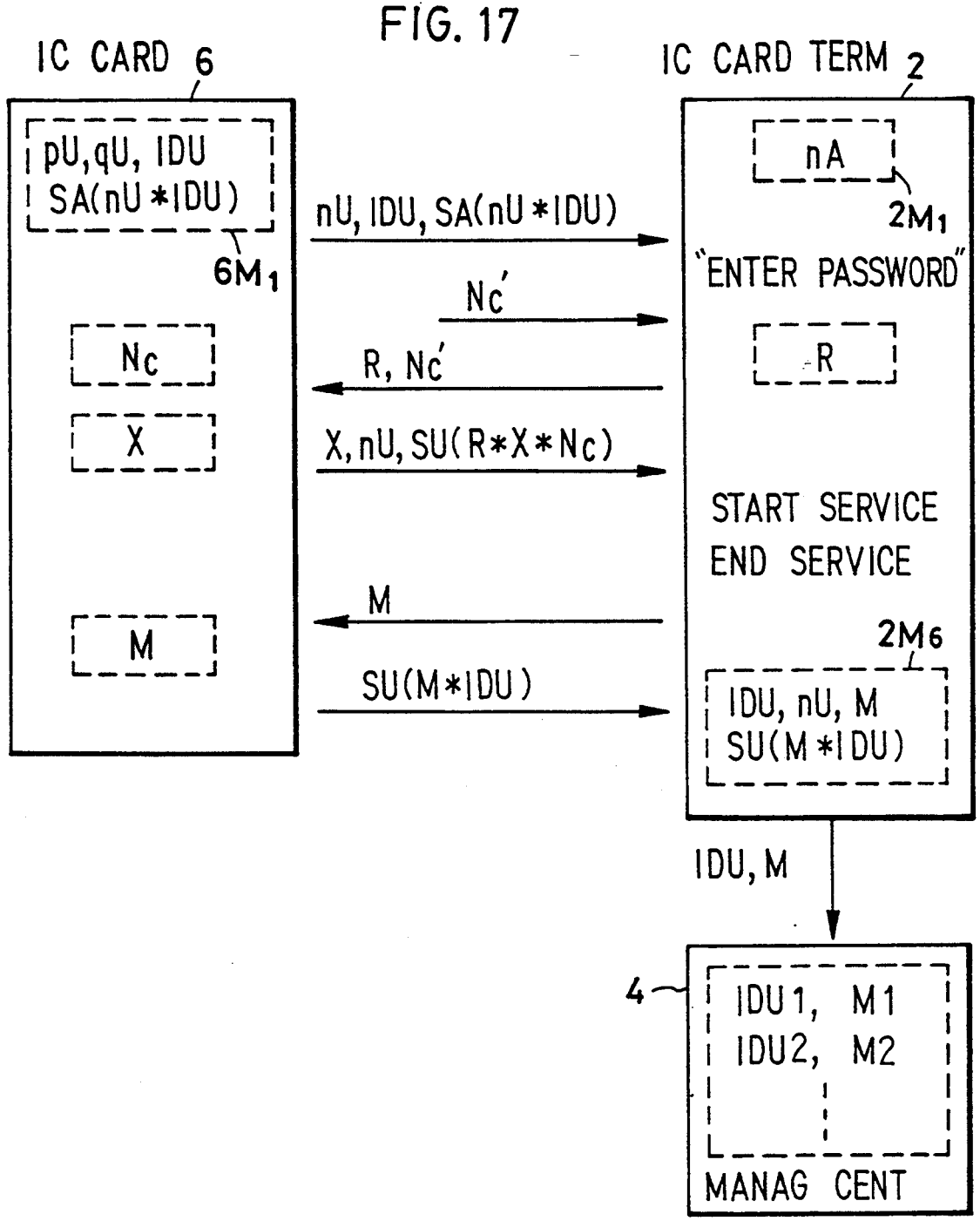

METHOD AND APPARATUS FOR SETTLEMENT OF ACCOUNTS BY IC CARDS

This application is a divisional of U.S. patent application Ser. No. 08/119,850, filed Sep. 13, 1993, now U.S. Pat. No. 5,396,558.

BACKGROUND OF THE INVENTION

The present invention relates to a method and apparatus for settlement of accounts by IC cards which are used as prepaid cards or credit cards.

For instance, in an IC card which is used as a prepaid card, there is written the amount of money paid for its purchase, and before or after receiving a service the card user inserts the IC card into an IC card terminal, wherein the remaining value after subtracting the charge for the service from the initial value is transmitted to and written into the IC card.

In a conventional system of this kind, the IC card and the IC card terminal use the same cipher system and have the same secret key and communicate to each other the balance information enciphered by the common secret key. The IC card and IC card terminal are designed so that such a secret key cannot be found nor can it be altered even if the IC card terminal should be revealed to an outsider.

On the other hand, in the case of an IC card for use as a credit card, its identification number and other necessary information are preregistered and the user is allowed to receive his desired service when inserting the IC card into an IC card terminal and is charged for the service afterward. In a conventional IC credit card system, upon insertion of the IC card into the IC card terminal, the latter is connected online to a management center where IC card identification numbers and other user information are registered, then the user inputs his registration number and other required information by dialing, the thus input information is sent to the management center, wherein the user information registered in advance is used to verify the validity of the user. After the user's validity is thus proved, the user is allowed to receive his or her desired service at the IC card terminal.

Such an IC credit card system similarly adopts, with a view to providing increased security, a method in which: the IC card and the IC card terminal use the same cryptographic scheme and have the same secret key and they each authenticate the other's validity; a password input into the IC terminal is checked with its counterpart prestored in the IC card; the IC card identification number read out of the IC card is sent from the IC card terminal to the management center which has a data base of identification numbers and other information of IC cards; the IC card identification number is verified in the management center; the result of the verification is transmitted to the IC card terminal; and when the IC card identification thus checked in the management center is valid, the service specified by the card user starts through the IC card terminal. In some cases, the IC card and the management center each authenticate the other's validity directly through use of the same secret key.

The conventional methods mentioned above all call for communication between the management center and the IC card terminal and online processing for verification before or after the service is provided, and hence they have shortcomings that the management center facility is inevitably large-scale and that the charge for the service includes communication expenses. Moreover, the history of service can be stored in the management center or IC card but difficulty is encountered in proving that the stored contents are not false. Although it is almost impossible to falsify the stored contents of the IC card unless the secret key is let out, the secret key information in the IC card or IC card terminal is not perfectly protected and may in some cases leak out over a long time. In the case where the cryptographic scheme used is broken by third parties and many IC terminals are used by them, particularly in the event that IC cards and IC terminals are abused by unauthorized persons over a wide range, it is very difficult to change all of the secret keys at the same time—this poses a serious social problem as well-intentioned users cannot use their IC cards for a long period of time, for instance.

SUMMARY OF THE INVENTION

It is therefore an object of the present invention to provide a method and apparatus for the payment of charges by IC cards which eliminate the need for communication between the management center and the IC card terminal each time the card user inserts his IC card into the latter to get his desired service and which permit detection of abuse of a forged IC card or intentionally altered IC card terminal.

In the method for the payment of charges by IC cards according to a first aspect of the present invention, the respective IC card has prestored in its memory means a master public key nA for verifying a master digital signature SA, a card identification number IDU for specifying the IC card and a first master digital signature SA1 for information containing at least the card identification number IDU, and the IC card terminal has prestored in its terminal memory the above-mentioned master public key nA, a terminal identification number IDT for specifying the IC card terminal and a second master digital signature SA2 for information including at least the above-mentioned terminal identification number IDT. This method includes:

- a step wherein the IC card transmits at least the card identification number IDU and the first master digital signature SA1 to the IC card terminal;
- a step wherein the IC card terminal vertifies the validity of the first master digital signature SA1 through use of the master public key nA and the card identification number IDU received from the IC card;
- a step wherein when the first master digital signature SA1 is valid, the IC card terminal transmits at least the terminal identification number IDT and the second master digital signature SA2 to the IC card;
- a step wherein the IC card verifies the validity of the second master digital signature SA2 through use of the master public key nA and the terminal identification number IDT received from the IC card terminal; and
- a step wherein when the second master digital signature SA2 is valid, the IC card terminal generates a value V corresponding to the charge for a service specified by the IC card after the service is provided.

In the method for the payment of charges by IC cards according to a second aspect of the present invention, the respective IC card has card information memory means wherein there are written, as card information, from a management center a card identification number IDU, a predetermined password setting number Ns, a second master digital signature SA2 for the password setting number Ns, a first master digital signature SA1 for information containing the card identification number IDU and the second master digital signature SA2 and an IC card terminal has terminal information memory means wherein there are written, as terminal information, from the management center a master public key nA for verifying the master digital signatures, terminal secret keys pT and qT for creating a terminal digital signature and a terminal public key nT for verifying the terminal digital signature. This method includes:

a step wherein the IC card transmits the card identification number IDU and the first and second master digital signatures SA1 and SA2 to the IC card terminal;

a step wherein the IC card terminal verifies the validity of the first master digital signature SA1 and, if it is valid, prompts the card user to input a password Nc' and transmits it to the IC card after it is input;

a step wherein the IC card compares the password Nc' received from the IC card terminal with the password Nc stored in the card information memory and, if they match, transmits an authentication signal to the IC card terminal; and a step wherein upon receiving the authentication signal, the IC card terminal becomes enabled for providing a service, and after the service, the IC card terminal records information including a value V corresponding to the charge for the service rendered and the card identification number IDU received from the IC card, as usage/management information, in usage/management information memory means.

According to a third aspect of the present invention, the IC card includes:

card information memory means for recording a master public key nA for verifying a master digital signature SA created using master secret keys pA and qA, a card identification number IDU for specifying or identifying the IC card, card secret keys pU and qU for creating a digital signature, a card public key nU for verifying the digital signature, and a first master digital signature SA1 for information containing the card identification number IDU and the card public key nU, the first master digital signature SA1 being created using the master secret keys pA and qA;

means for transmitting the card identification number IDU, the card public key nU and the first master digital signature SA1 to the IC card terminal;

means which receives a terminal identification number IDT, a terminal public key nT and a second master digital signature SA2 from the IC card terminal, verifies the second master digital signal SA2 through use of the master public key nA recorded in the card information memory means and, if it is valid, transmits to the IC card terminal an authentication signal which enables it for providing a service; and usage information memory means for recording usage information including the remaining value V' updated by subtracting the charge for the service rendered.

According to a fourth aspect of the present invention, the IC card terminal includes:

memory means for recording a master public key nA for verifying a master digital signature SA created using master secret keys pA and qA, a terminal identification number IDT for identifying the IC card terminal, terminal secret keys pT and qT for creating a terminal digital signature, a terminal public key nT for verifying the terminal digital signature and a second master digital signature SA2 for information including the terminal identification number IDT and the terminal public key nT, the second master digital signature SA2 being created using the master secret keys pA and qA;

means for transmitting the terminal public key nT, the terminal identification number IDT and the second master digital signature SA2 to an IC card;

means which receives a card identification number IDU, a card public key nU and a first master digital signature SA1 from the IC card, verifies the first master digital signature through use of the master public key recorded in the memory means and, if it is valid, enables the IC card terminal for providing a service; and means which updates remaining value through use of the charge for the service rendered and transmits to the IC card usage information including the updated remaining value.

A digital signature scheme capable of proving that a person who transmitted digital information acknowledged it, just like he puts his seal to a document, is already established as disclosed in, for example, "ESIGN: An Efficient Digital Signature Scheme," NTT R & D Vol. 40, No. 5, 1991, pp687–686, or U.S. Pat. No. 4,625,076. According to the digital signature scheme, a document M and a secret key Q are used and a digital signature S(M) is created using a signature creating function, then the signature S(M) and the document M are transmitted to the other party. The other party performs a computation by substituting the received document M and signature S(M) and a public key U into a signature verifying function. If the computed result satisfies predetermined conditions, then it is verified that the digital signature S(M) was attached to the document M by a person having the secret key Q, and he cannot deny the fact. In this instance, the Q and U are different prime numbers of extremely large values (that is, $Q \neq U$), and this scheme features a mathematical property that the value Q cannot be computed even if the value of U is known. Furthermore, even if slightly altered, the document can be proved invalid. It is set forth in the above-noted literature that these digital signature functions could be executed within a practical processing time on the scale of a program mountable on IC cards, through utilization of an algorithm called ESIGN.

Other digital signature schemes applicable to the present invention are an ElGamal scheme (T. E. ElGamal: A public key cryptosystem and a signature scheme based on discrete algorithm, Proc. of Crypto'84, 1984), a DSA (Digital Signature Algorithm, made public by the National Institute of Standards and Technology of the U.S. Department of Commerce) scheme, and a Micali-Shamir scheme (S. Micali and A. Shamir: An improvement of the Fiat-Shamir identification and signature scheme, Proc. of Crypto '88, pp244–247, 1988), for instance.

BRIEF DESCRIPTION OF THE DRAWINGS

FIG. 5A is a functional block diagram of the IC card in the embodiment of FIG. 5;

FIG. 5B is a functional block diagram of the IC card terminal in the embodiment of FIG. 5;

FIG. 12 is a diagram showing procedures for receiving a service by use of the IC card with the password registered therein by the process depicted in FIG. 13;

FIG. 17 is a diagram illustrating another embodiment of procedures for receiving a service by use of an IC card applied to a credit card.

DESCRIPTION OF THE PREFERRED EMBODIMENTS

Figure 1:
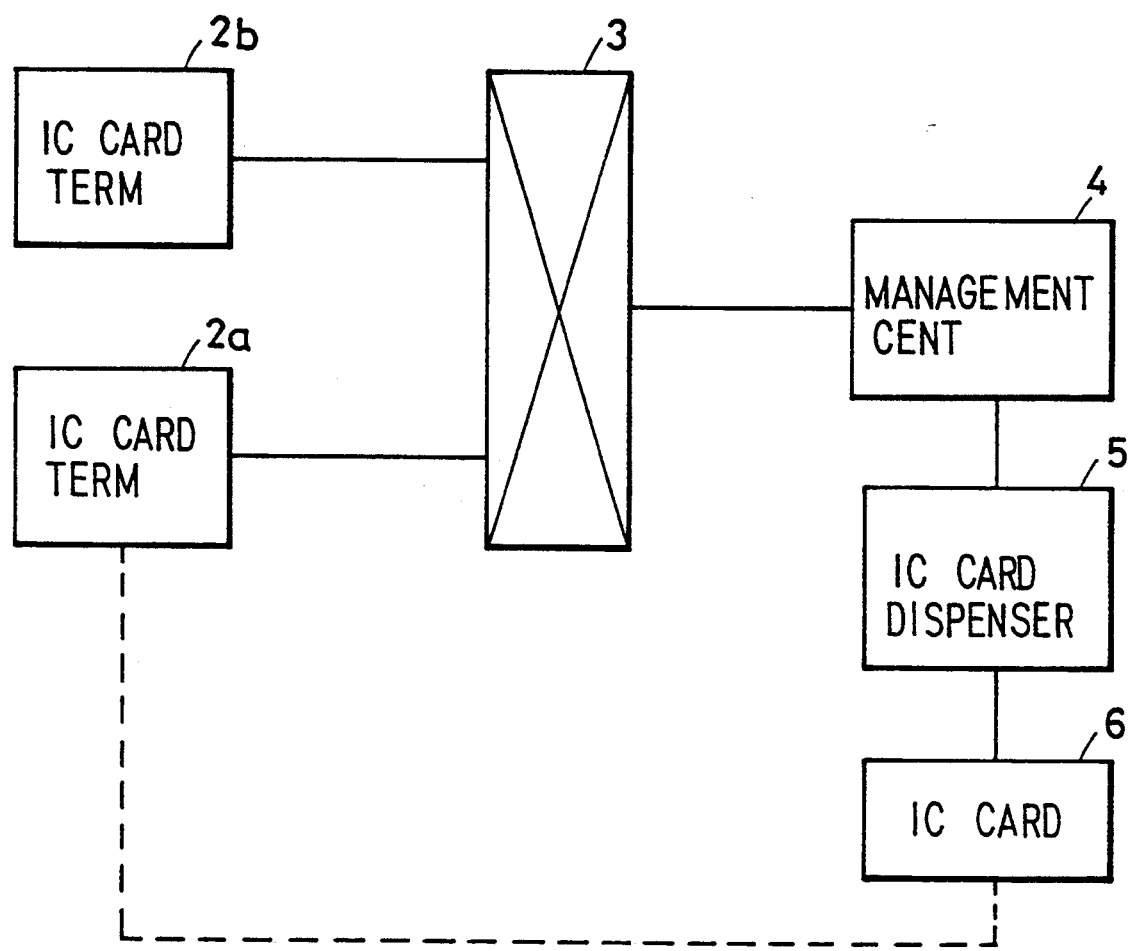
FIG. 1 is a block diagram illustrating the system configuration of an embodiment of the present invention.

In FIG. 1 there is illustrated in block form an example of the configuration of a card system for making the payment of charges through use of an IC card according to the present invention. IC card terminals 2a, 2b, . . . perform processing for the payment of charges for services rendered to an IC card 6. For example, when the IC card 6 is a prepaid telephone card, the IC card terminals 2a, 2b, . . . provide service by telephone. The IC card terminals 2a, 2b, . . . , when installed, are each connected via a communication network 3 to a management center 4 which sets and holds security information under its control. In the following description the IC card terminals will be indicated generally by a numeral 2 except when a particular one of them is intended. The IC card 6 has initial data written by the IC card dispenser 5 when it is issued, and security information necessary for the IC card 6 is provided from the management center 4. Incidentally, in the case where some functions of the management center 4 are mounted on a portable telephone terminal or the like so that they are brought to the place where the IC card terminal 2 is located, the IC card terminal 2 need not always be connected via the communication network 3 to the management center 4 when it is installed.

Figure 2:
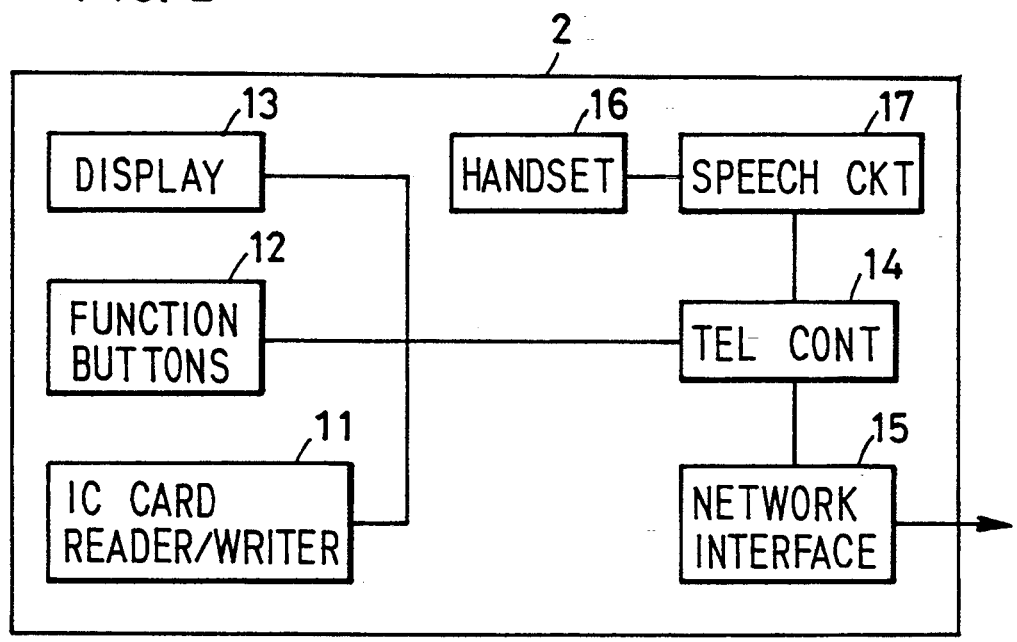
FIG. 2 is a block diagram showing an example of the configuration of an IC card terminal.
Figure 3:
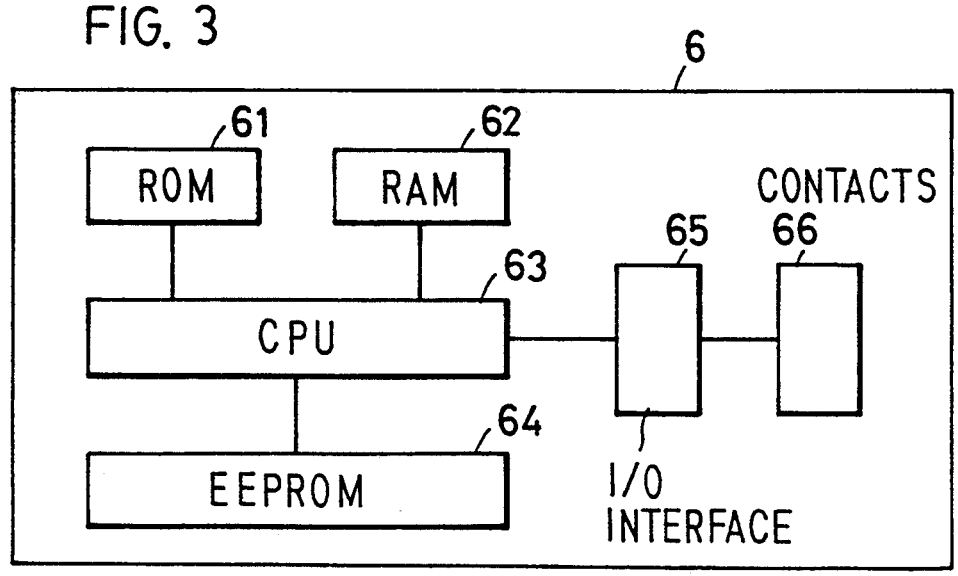
FIG. 3 is a block diagram showing an example of the configuration of an IC card.

FIG. 2 illustrates an example of the internal configuration of the IC card terminal 2 and FIG. 3 an example of the internal configuration of the IC card 6. The IC card terminal 2 comprises an IC card reader/writer 11 which reads and writes the IC card 6 inserted thereinto, function buttons 12 as of a keyboard, a display 13, a telephone controller 14, a network interface 15 for processing communication via the communication network 3, a handset 16 and a speech circuit 17.

In the IC card 6 there are stored in a ROM 61 programs for IC card procedures, digital signature creating and verifying algorithms and so forth, and a CPU 63 controls the entire processing of the IC card while utilizing a RAM 62 as a work area and communicates with the IC card reader/writer 11 of the IC card terminal 2 via an I/O interface 65 and contacts 66.

Figure 4A:
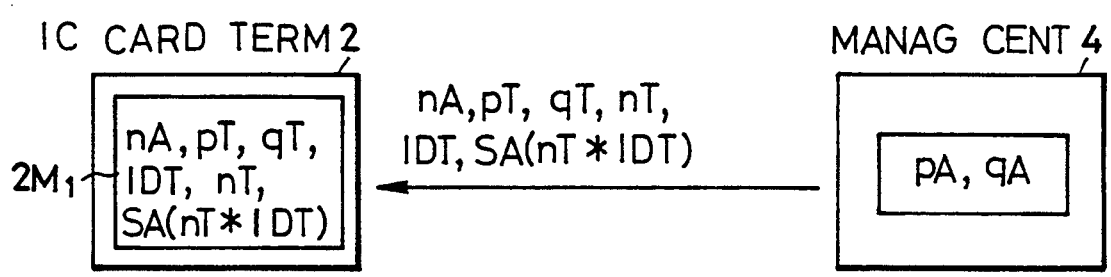
FIG. 4A is a diagram showing processing of a management center for setting the IC card terminal.

FIG. 4A shows the process that is performed when the IC card terminal 2 is installed. The IC card terminal 2 receives from the management center 4 such pieces of terminal information as listed below when it is installed.

(1) Master public key nA for verifying a master digital signature of the management center 4;

(2) Terminal secret keys pT and qT for the IC card terminal 2 to create a digital signature;

(3) Terminal public key nT for verifying the digital signature of the IC card terminal 2;

(4) Terminal identification number IDT for identifying the IC card terminal 2; and (5) Master digital signature SA(nT:*IDT) by the management center for the terminal public key nT and the terminal identification number IDT, where the symbol "*" represents concatenation—for example, 001*0101=0010101.

After receiving these pieces of information, the IC card terminal 2 verifies the validity of the master digital signature SA(nT*IDT) through use of the terminal public key nT, the terminal identification number IDT and the master public key nA, and if the master digital signature SA(nT*IDT) is valid, then the IC card terminal 2 records these pieces of information in a terminal information area 2M₁ of a memory in the telephone controller 14. No description will be given of the method for verifying the digital signature, because it is disclosed in the afore-noted various digital signature schemes. As described previously, the verification of the digital signature S(M) generally calls for an unsigned full document M and a public key for verification use, but in the following description there are cases where a simplified description, "the digital signature is verified using the public key" or "digital signature is verified" is used.

Incidentally, the management center 4 has set therein its master secret keys pA and qA and has functions of creating a different terminal identification number IDT for each IC card terminal 2 and the terminal public key nT and the terminal secret keys pT and qT corresponding to the terminal identification number IDT.

It is preferable that the terminal secret keys pT and qT be recorded in the terminal information area $2M_1$ in the IC card terminal 2 which is not easily accessible from the outside, for example, in a RAM of a one-chip CPU or battery backup RAM of a construction wherein the power supply from the battery is cut off when the IC card terminal 2 is abused.

Figure 4B:
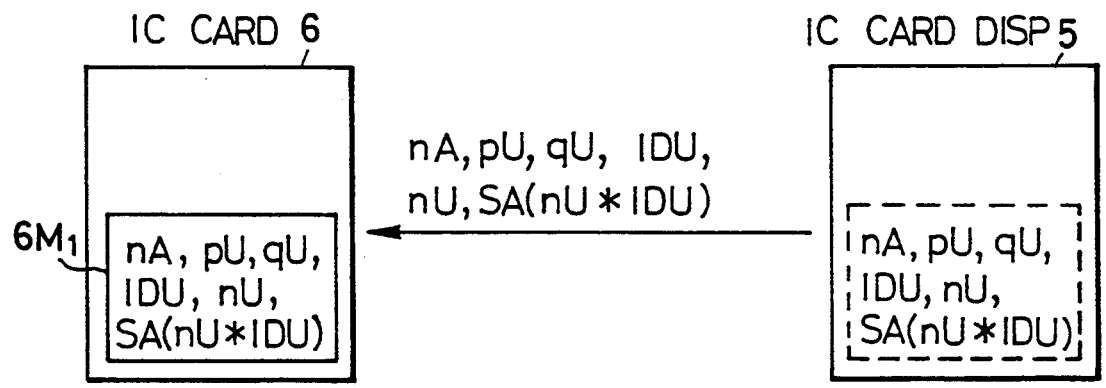
FIG. 4B is a diagram showing processing of an IC card dispenser when dispensing the IC card.

In FIG. 4B there is shown the process that is performed by the IC card dispenser 5 when it issues the IC card 6. The IC card 6 receives from the IC card dispenser 5 such pieces of card information listed below that need to be held in the IC card 6. These pieces of information are provided in advance from the management center 4 to the IC card dispenser 5.

(1) Master public key nA for verifying the master digital signature of the management center 4;
(2) Card secret keys pU and qU for the IC card 6 to create it digital signature;
(3) Card public key nU for verifying the digital signature of the IC card 6;
(4) Card identification number IDU for identifying the IC card 6;
(5) Master digital signature SA(nU*IDU) of the management center 4 for the card public key nU and the card identification number IDU.

After receiving these pieces of card information, the IC card 6 verifies the validity of the master digital signature SA(nU*IDU) through use of the master public key nA and, if it is valid, the IC card 6 records these pieces of card information in a predetermined area (hereinafter referred to as a card information area) $6M_1$ in an EEPROM 64. Since the EEPROM 64 in the IC card 6 usually is not directly accessible from the outside, these pieces of card information cannot be read out to the outside of the IC card unless a predetermined procedure is executed. In particular, the card secret keys pU and qU need not be read out to the outside of the IC card 6 after once recorded therein, and hence they may preferably be held unreadable. In the process shown in FIG. 4B an amount of money is not yet written into the IC card 6.

The management center 2 has functions of creating a different card identification number IDU for each IC card and the card public key nU and the card secret keys pU and qU corresponding to the IC card identification number IDU.

Figure 4C:
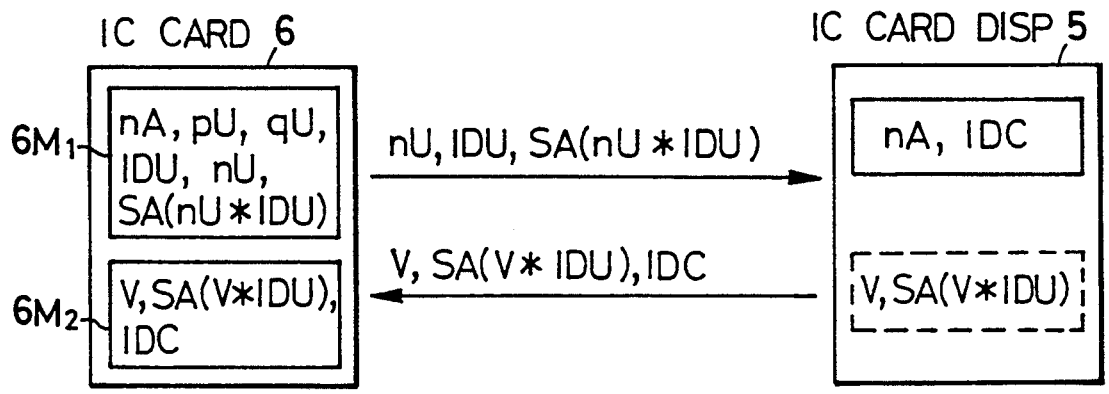
FIG. 4C is a diagram showing procedures between the IC card and the IC card dispenser for dispensing and recharging the latter.

FIG. 4C shows processing for writing into the IC card 6 the amount of money prepaid therefor when it is a prepaid card. The procedure shown in FIG. 4C is used for initial issuing of the IC card 6 and recharging an amount of money into the IC card 6 when no money is left over.

The IC card 6 transmits to the IC card dispenser 5 the public key nU, the identification number IDU and the master digital signature SA(nU*IDU) which it read out of the card information area $6M_1$. The IC card dispenser 5 verifies the master digital signature SA(nU*IDU) by use of the master public key nA preset therein and, if valid, recognizes that the IC card is valid. In this instance, the IC card dispenser 5 transmits to the IC card 6 a master digital signature SA(V*IDU) for a prepaid amount of money V (i.e. an initial value of the remainder) and the card identification number IDU and the amount of money V, provided from the management center 4, and an IC card dispenser identification number IDC preset in the IC card dispenser 5. The IC card 6 verifies the master digital signature SA(V*IDU) by use of the master public key nA and, if valid, records these pieces of information in a usage information area $6M_2$ of the EEPROM 64 in the IC card 6.

It is also possible to employ a system configuration in which, for each IC card issuing process, the IC card dispenser 5 is connected online to the management center 4 to transmit thereto the IC card identification number IDU and the value V received from the IC card 6 and the IC card dispenser 5 receives, in turn, the master digital signature SA(V*IDU) of the management center 4. Alternatively, these pieces of information may be prestored in the IC card dispenser 5.

Figure 5:
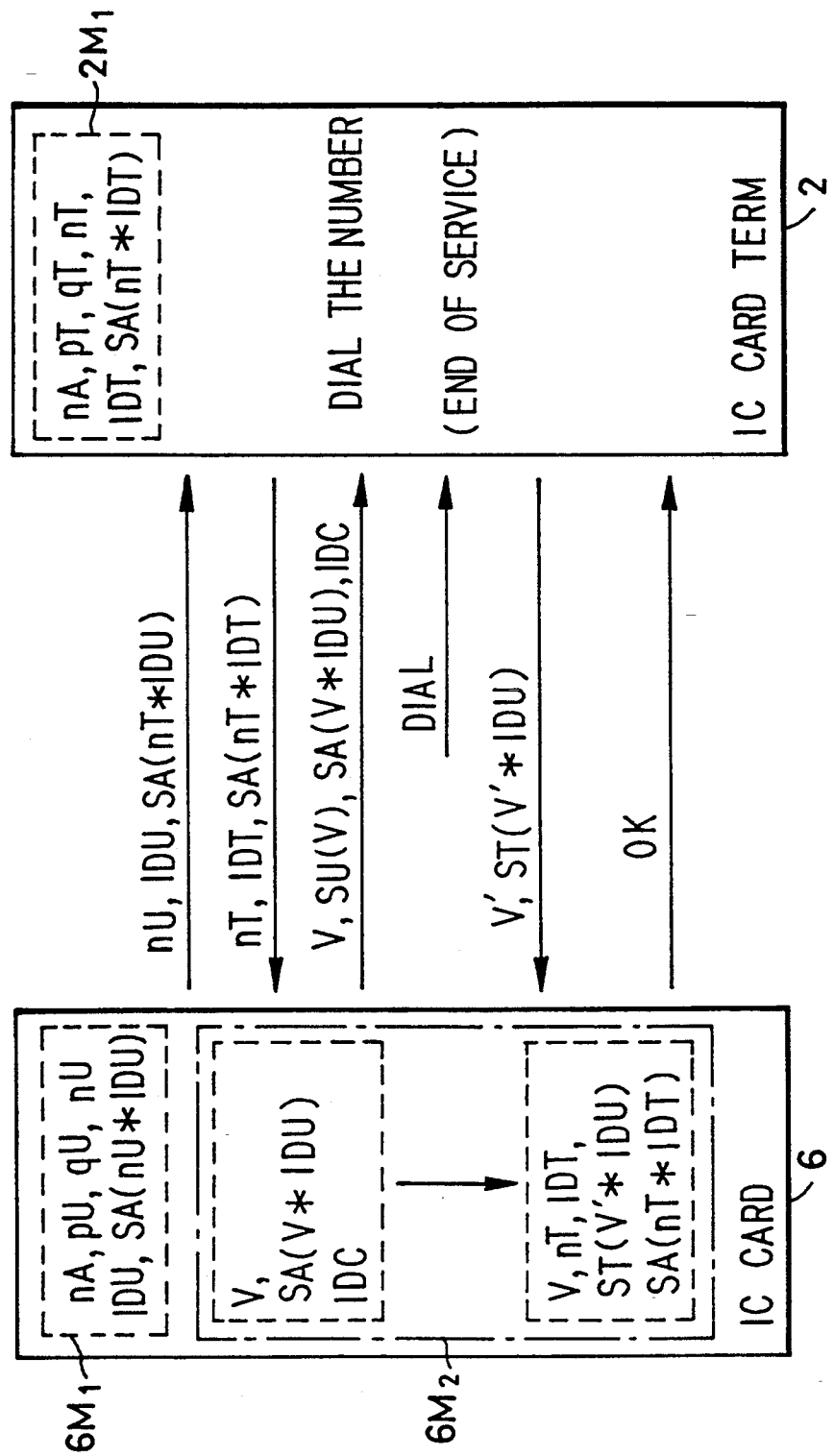
FIG. 5 is a diagram showing procedures between the IC card and the IC card terminal.

FIG. 5 shows processing for the card user to receive a service from the IC card terminal 2 by use of the IC card 6 which is a prepaid card. FIGS. 5A and 5B show functional blocks of the IC card 6 and the IC card terminal 2. In this case, however, random generating parts 6C and 2C are shown corresponding to an embodiment described later in respect of FIG. 6. In the usage information area $6M_2$ of the EEPROM 64 in the IC card 6 there are recorded, as card usage information, the initial value V, master digital signature SA(V*IDU) and card dispenser identification number IDC. When the user inserts the IC card 6 into the IC card reader/writer 11 of the IC card terminal 2, the card public key nU, the card identification number IDU and the master digital signature SA(nU*IDU) are sent from the IC card 6 to the IC card terminal 2.

The IC card terminal 2 verifies the master digital signature SA(nU*IDU) by use of the master public key nA in a verifying part 2A (FIG. 5B) and, if valid, sends via a transmitting/receiving part 2E to the IC card 2 the pieces of terminal information nT, IDT and SA(nT*IDT) read out of the terminal information area $2M_1$. The IC card 6 receives these pieces of terminal information via a transmitting/receiving part 6D and verifies the validity of the master digital signature SA(nT*IDT). If it is valid, then the remaining value V, the identification number IDC and the master digital signature SA(V*IDU), which are pieces of card usage information read out of the usage information area $6M_2$ of the memory 64 in the IC card 6, and a digital signature SU(V) of the IC card, which is generated for the value V in a digital signature creating part 6B through use of the card secret keys pU and qU, are sent to the IC terminal 2.

The IC card terminal 2 verifies the received digital signature SU(V) by use of the card public key nU and the value V in the verifying part 2B. If it is valid, then the IC terminal 2 further checks the master digital signature SA(V*IDU) by the pieces of information nA, V and IDU to ensure that the value V has not been falsified, after which the IC terminal 2 displays the remaining value V of the IC card 6 on a display 13. While referring to the guidance provided on the display 13, the user specifies his desired service by pressing the function buttons 12. The IC card terminal 2 reads out the charge for the thus specified service from a list prestored in a memory of the telephone controller 12 or accesses the communication network 3 and receives the necessary service charge information via the network interface 15 from the communication network 3 or a service center (not shown). The IC card terminal 2 compares the charge for the service (hereinafter referred to as a service charge) v and the remaining value V and, when the latter is larger than the former, the IC card terminal 2 begins to provide the specified service. For example, in the case of a telephone service, when the value V is 10 yen or more, the IC card terminal 2 provides a prompt on the display 13 for input of the telephone number of a subscriber to be called and originates a call as the user dials the number.

In the above, when any one of the digital signatures is found invalid through verification, the IC card terminal 2 stops processing at that point and ejects or returns the IC card 6 to the user.

After completion of the service or call, the telephone controller 14 of the IC card terminal 2 (a remaining value updating part 2D in FIG. 5B) subtracts the service charge v—prestored in the memory of the telephone controller 14 or transmitted from the communication network 3 or service center—from the remaining value V to obtain a new remaining value V', after which the telephone controller 14 creates, in its digital signature creating part 2B, a terminal digital signature ST(V'*IDU) for the value V' and the card identification number IDU through use of the terminal private keys pT and qT. Then the IC card terminal 2 sends the value V' and the digital signature ST(V'*IDU) to the IC card 6.

The IC card 6 verifies the received digital signature ST(V'*IDU) by use of the public key nT in the verifying part 6A and, if it is valid, records the remaining value V' and the other pieces of information nT, IDT, SA(nT*IDT) and ST(V'*IDU) received from the IC card terminal 2, as card usage information, in the usage information area $6M_2$ of the EEPROM 64, erasing the previous card usage information. That is, the card usage information in the usage information area $6M_2$ is updated as indicated by the arrow in FIG. 5.

It is also possible to employ a configuration in which in the case of updating the usage information area $6M_2$ in the EEPROM 64 of the IC card 6 with the current card usage information including the new remaining value V' received from the IC card terminal 2, the current remaining value V' is compared with the previous remaining value V in the usage information area $6M_2$ and if the latter is greater than the former, then the new remaining value V' is regarded as abnormal or invalid. When such an abnormality is detected, the usage information area $6M_2$ of the IC card 6 is not updated but instead a code representing the abnormality detection is written into the IC card 6 to prevent its further use. This ensures to prevent the remaining value of the IC card 6 from being raised by altering the IC card terminal 2. Upon completion of the updating of the usage information area $6M_2$, an authentication information (OK) representing it is sent to the IC card terminal 2.

In this embodiment, when either one of the digital signatures SA and ST is abnormal, the remaining value is not updated but instead the abnormal contents of the IC card are recorded in a code form.

Since the IC card 6 and the IC card terminal 2 transmit to and receive from each other their identification numbers appended with the master digital signature of the management center as mentioned above, even if the transmitted and received contents are falsified by altering the IC card 6 or IC card terminal 2, the abuse can be detected by the verification of the digital signature at the receiving side. Moreover, even if the contents of the IC card could be copied to another IC card using a stolen IC card terminal, the falsification of the master digital signature of the management center for the card identification number is so difficult that there is no choice but to copy it; hence, such a copy can be checked by acquiring data of the abused IC card.

Figure 6:
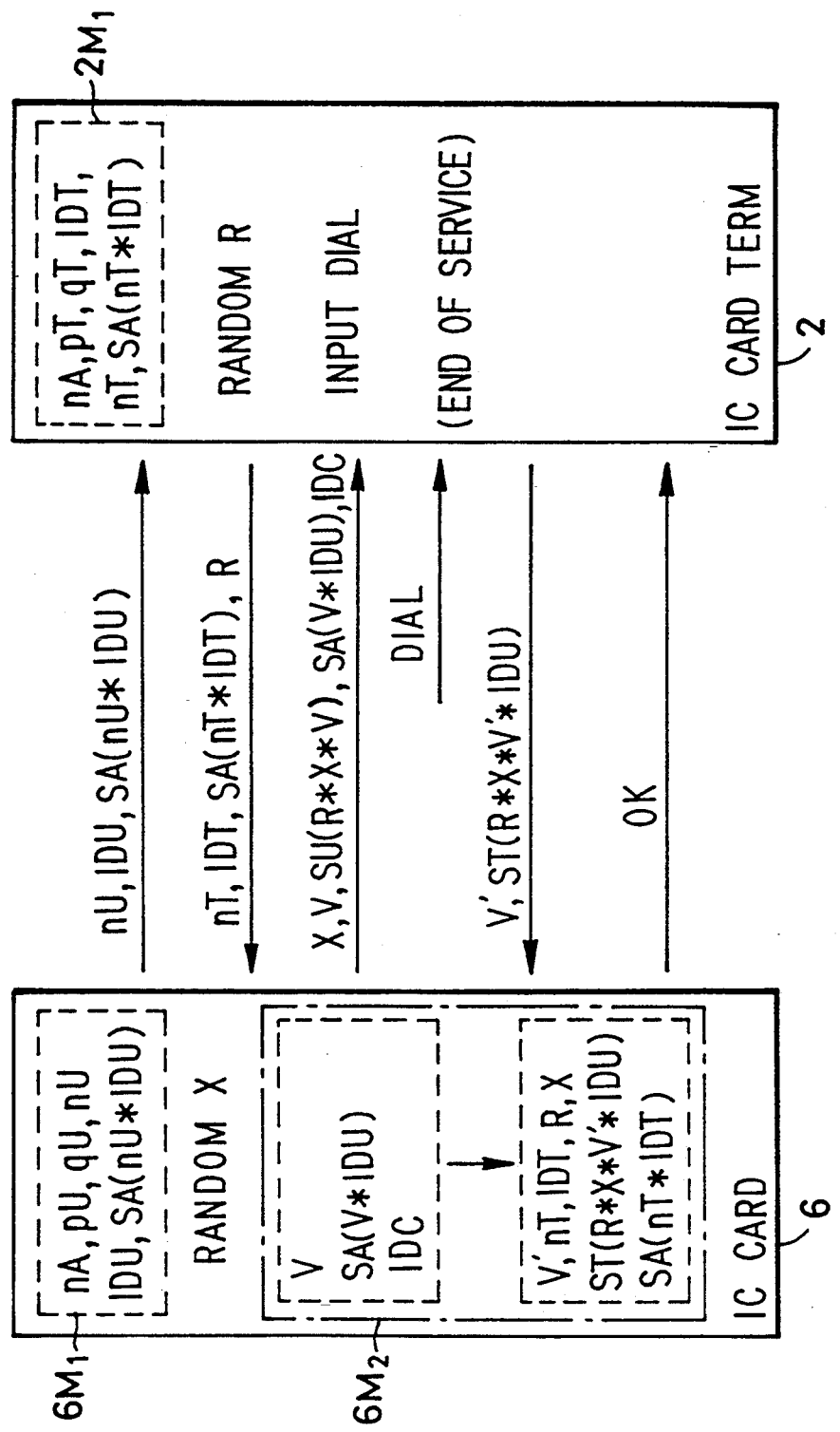
FIG. 6 is a diagram showing another example of the procedure between the IC card and the IC card terminal.

In FIG. 6 there are shown procedures for providing increased security against wire tapping of communication between the IC card 6 and the IC card terminal 2 through use of random numbers in the procedure of sending the remaining value V' from the former to the latter.

When the IC card terminal 2 recognizes the validity of the IC card 6 inserted thereinto, by verifying the master digital signature SA(nU*IDU) received from the IC card 6 as described above with respect to FIG. 5, the IC card terminal 2 generates a random number R in a random generating part 2C (FIG. 5B) and sends it to the IC card 6 together with the pieces of information nT, IDT and SA(nT*IDT). The IC card 6 verifies the master digital signature SA(nT*IDT) by use of the master public key nA and the received pieces of information nT and IDT. When the master digital signature is valid, the IC card 6 generates a random number X in a random generating part 6C (FIG. 5A) and creates a digital signature SU(R*X*V) of the IC card 6 for the random number R, the random number X and the remaining value V by use of the card secret keys pU and qU and then sends the thus created digital signature to the IC card terminal 2 together with the random number X and the pieces of card usage information V, SA(V*IDU) and IDC read out of the usage information area $6M_2$.

The IC card terminal 2 checks the master digital signature SA(V*IDU) to ensure that the remaining value V was provided from a valid terminal (including an IC card dispenser) to the IC card 6. Furthermore, the IC card terminal 2 verifies the digital signature SU(R*X*V) through use of the received X, V, the card public key nU and the previously generated random number R to ensure that the remaining value V is one that was received from the valid IC card 6. Then the IC card terminal 2 permits the start of the service specified by the card user.

Upon completion of the service, the IC card terminal 2 generates a digital signature ST(R*X*V'*IDU) for a new remaining value V', the card identification number IDU and the random numbers R and X and sends it to the IC card 6 together with the new remaining value V'. The IC card 6 verifies the digital signature ST(R*X*V'*IDU) by the pieces of information IDU, R, X, V' and nT to ensure that the remaining value V' is valid, thereafter updating the usage information area $6M_2$ with all the pieces of information received from the IC card terminal 2.

With such a configuration, the random numbers R and X take different values for each use of the IC card, and consequently, the digital signatures SU and ST also change. Hence, even if an outsider intercepts signals between the IC card 6 and the IC card terminal 2 and sends to the latter the same signals as those intercepted without using any IC card, the signals do not match because of different random numbers; therefore, wrong manipulation can be prevented. Moreover, even if the intercepted signals are sent by some means to the IC card 6 in the process of updating the remaining value, the signals do not match, and hence such wrong manipulation can be prevented.

Figure 7:
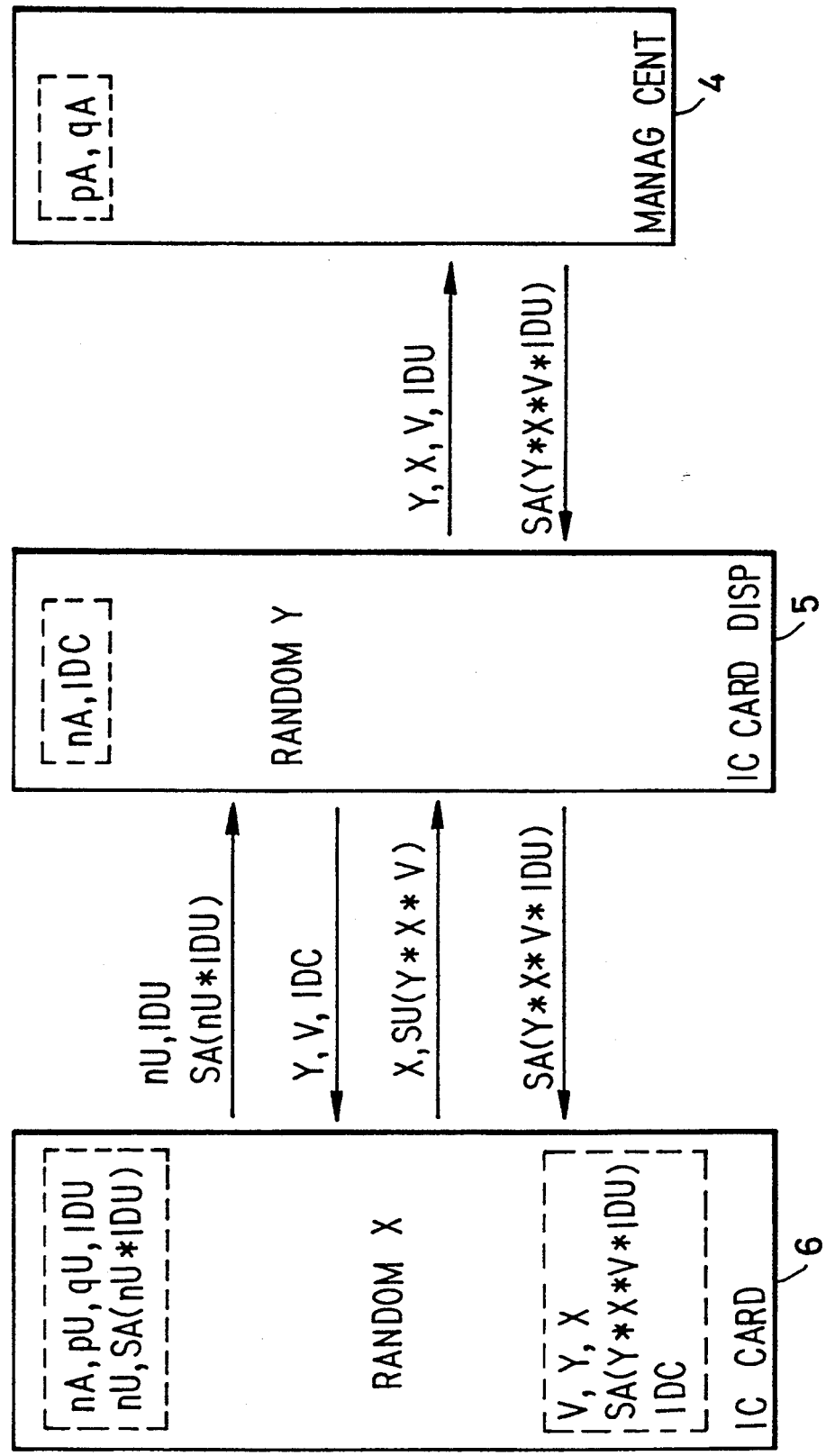
FIG. 7 is a diagram showing, by way of example, procedures between the IC card, the IC card terminal and the management center at the time of writing amount-of-money information into the IC card.

FIG. 7 shows procedures which provide increased security through use of random numbers at the time of writing the prepaid value into the IC card 6 when it is initially issued or recharged. It is assumed here that the IC card dispenser 5 and the management center 4 are connected online as shown in FIG. 1.

When inserted into the IC card dispenser 5, the IC card 6 sends thereto the card public key nU, the card identification number IDU and the master digital signature SA(nU*IDU). The IC card dispenser 5 verifies the validity of the master digital signature SA(nU*IDU) by use of the master public key nA to ensure that the IC card is valid. Then the IC card dispenser 5 generates a random number Y and sends it to the IC card 6 together with the amount information V and the dispenser identification number IDC.

The IC card 6, in turn, generates the random number X and then generates a digital signature SU(Y*X*V) for the random numbers Y and X and the amount information V, thereafter sending it to the IC card dispenser 5 together with the random number X.

The IC card dispenser 5 verifies, in turn, the digital signature SU(Y*X*V) by use of the card public key nU and, if it is valid, transmits the random numbers X and Y, the amount information V and the card identification number IDU to the management center 4.

The management center 4 generates a master digital signature SA(Y*X*V*IDU) for these pieces of information received from the IC card dispenser 5 and transmits it there-through to the IC card 6. The IC card 6 recognizes the validity of the management center 4 through verification of the master digital signature SA(Y*X*V*IDU) by use of the master public key nA and records the entire information received from the IC card dispenser 5 in the usage information area 6M$_2$ in the memory 64.

Incidentally, the IC card dispenser 5 may be of a configuration wherein it does not perform the verification processing but only reads and writes data into the IC card 6. In such an instance, the IC card dispenser 5 functions only as a relay for the respective information, and the verification of digital signatures and the generation of the random number are preformed by the management center 4.

Figure 8:
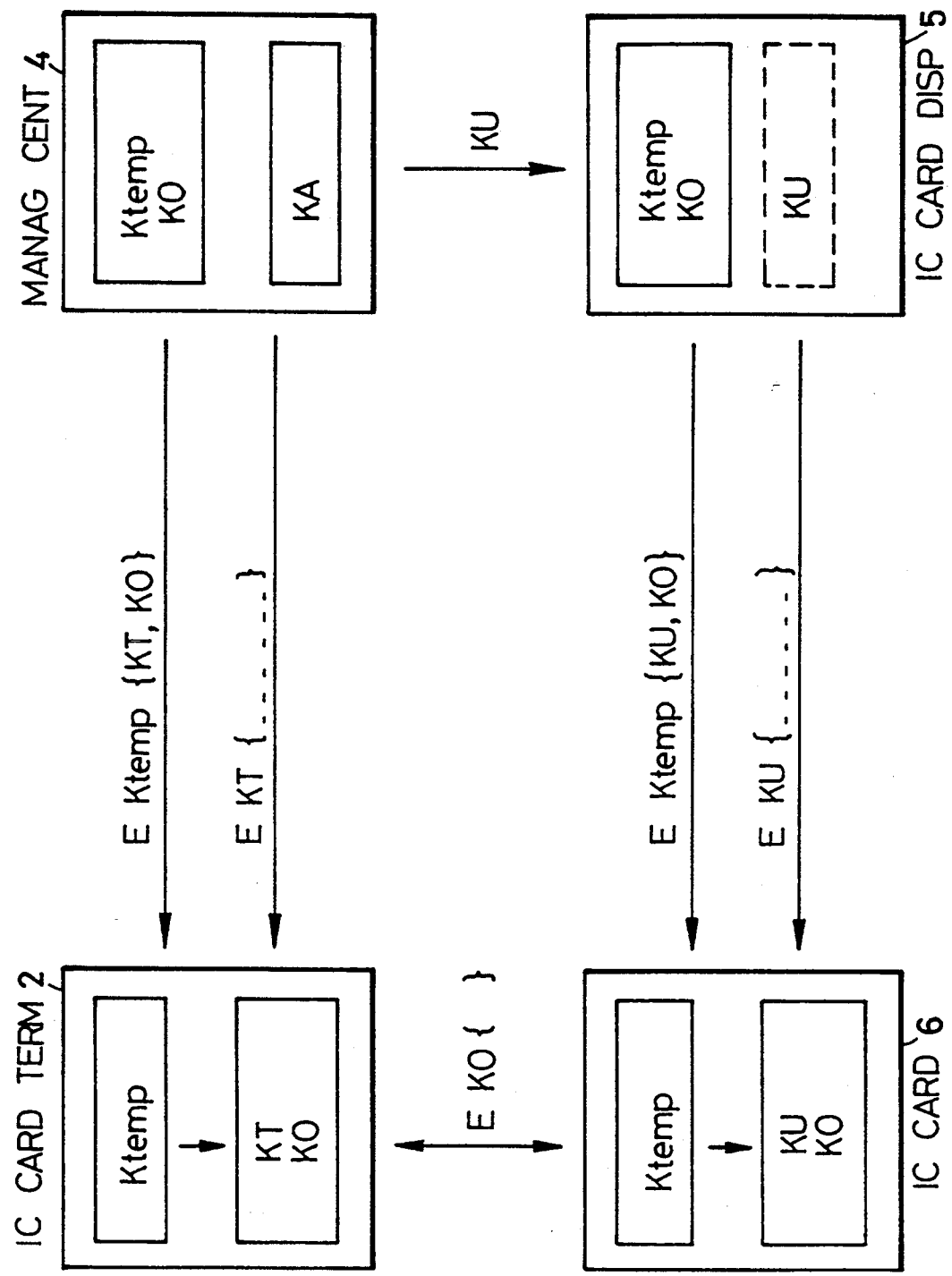
FIG. 8 is a block diagram showing the distribution of encrypting keys for cipher communication between the IC card, the IC card terminal, the IC card dispenser and the management center.

FIG. 8 shows procedures for setting a secret key which is used not only to encrypt the contents of communication at the transmitting side but also to decrypt them at the receiving side so as to prevent the information from being stolen or falsified on the communication path between the management center 4, the IC card terminal 2, the IC card 6 and the IC card dispenser 5 which are each located at a place remote from the others and transmit information thereto using a communication procedure.

The management center 4 has an encrypting function E for cipher communication, a temporary common key Ktemp and a common key KO for encryption use, and a key creating master key KA for deriving encrypting keys KT and KU for cipher communication from specific information such as terminal and card identification numbers IDT and IDU. In this case, it is possible to use, as the encrypting function E, an algorithm FEAL disclosed in "Fast data encipherment algorithm FEAL," IECEJ Technical Report IT 86-33 (1986), for instance. The encipherment of the document M by the key K will be indicated by EK {M}.

The IC card terminal 2 has the temporary common key Ktemp recorded in its memory when it was manufactured, and when it is installed, it receives the encrypting terminal key KT and the common key KO by a cipher communication using the temporary common key Ktemp and records these keys KO and KT in the memory. Thereafter, the transmission and reception of signals between the management center 4 and the IC card terminal 2, described previously in conjunction with FIG. 4A, are carried out by cipher communication using the key KT inherent to the terminal 2.

The IC card 6 has the temporary common key Ktemp recorded in its memory when it was fabricated, and when it is issued, it receives the encrypting key KU and the common key KO via the IC card dispenser 5 and records these keys KU and KO in the memory. The encrypting key KU is generated from the card identification number IDU under the master key KA.

The key KU may be delivered from the management center 4 to the IC card dispenser 5 together with the pieces of data nA, IDU, ... when they are delivered as described previously with respect to FIG. 5B. After this, the transmission and reception of signals between the IC card 6 and the IC card dispenser 5 described previously in respect of FIGS. 4B and 4C are performed by cipher communication using the key KU inherent to the card 6.

On the other hand, the transmission and reception of signals between the IC card terminal 2 and the IC card 6 shown in FIGS. 5 and 6 are carried out by cipher communication using the common key KO.

In the case where the IC card dispenser 5 and the management center 4 are connected online as described previously with reference to FIG. 7, the transmission of the card identification number IDU from the IC card 6 to the management center 4 enables the latter to derive the key KU from the card identification number IDU by use of the master secret key KA; therefore, it is possible to provide increased security by using the encrypting key KU inherent to the card, in place of the common key KO, for writing the prepaid amount into the card or recharging it.

While the foregoing description has been given on the assumption that the IC card dispenser 5 and the management center 4 are located at different places, they may be formed as a unitary structure with each other, and it is also possible to enclose the IC card dispenser 5 and the IC card terminal 2 in the same housing. Moreover, in the cases of transmitting the terminal secret keys pT and qT from the management center 4 to the IC card terminal 2 and transmitting the card secret keys pU and qU from the IC card dispenser 5 to the IC card 6, security can be further increased by transmitting the keys together with the master digital signature of the management center 4 and by verifying the signature at the receiving side.

According to the embodiments of FIGS. 5 and 6, since the IC card 6 and the IC card terminal 2 each transmit the identification number and the public key to the other together with the master digital signature of the management center 4, even if the contents of communication are falsified by, for example, forcing the IC card terminal 2 open, the falsification can be detected by verifying the master digital signature of the management center 4 at the receiving side. Furthermore, even if the contents of the IC card 6 could be copied to another IC card by a stolen IC card terminal, for instance, the falsification of the master digital signature of the management center 4 is so difficult that there is no choice but to copy it intact; therefore, the copy could be checked by acquiring data of the IC card used.

Besides, it is impossible to issue an IC card equivalent to a normal or valid one by altering a stolen IC card terminal or through use of a personal computer and an IC card reader unless the master secret key for generating the master digital signature of the management center, placed under strict supervision, is known. In addition, since the validity of the IC card and the IC card terminal is verified by the identification number appended with the master digital signature of the management center 4 as referred to above, the IC card terminal 2 does not need to inquire of the management center 4 about the validity of the IC card 6 prior to or during the service being rendered.

Figure 9:
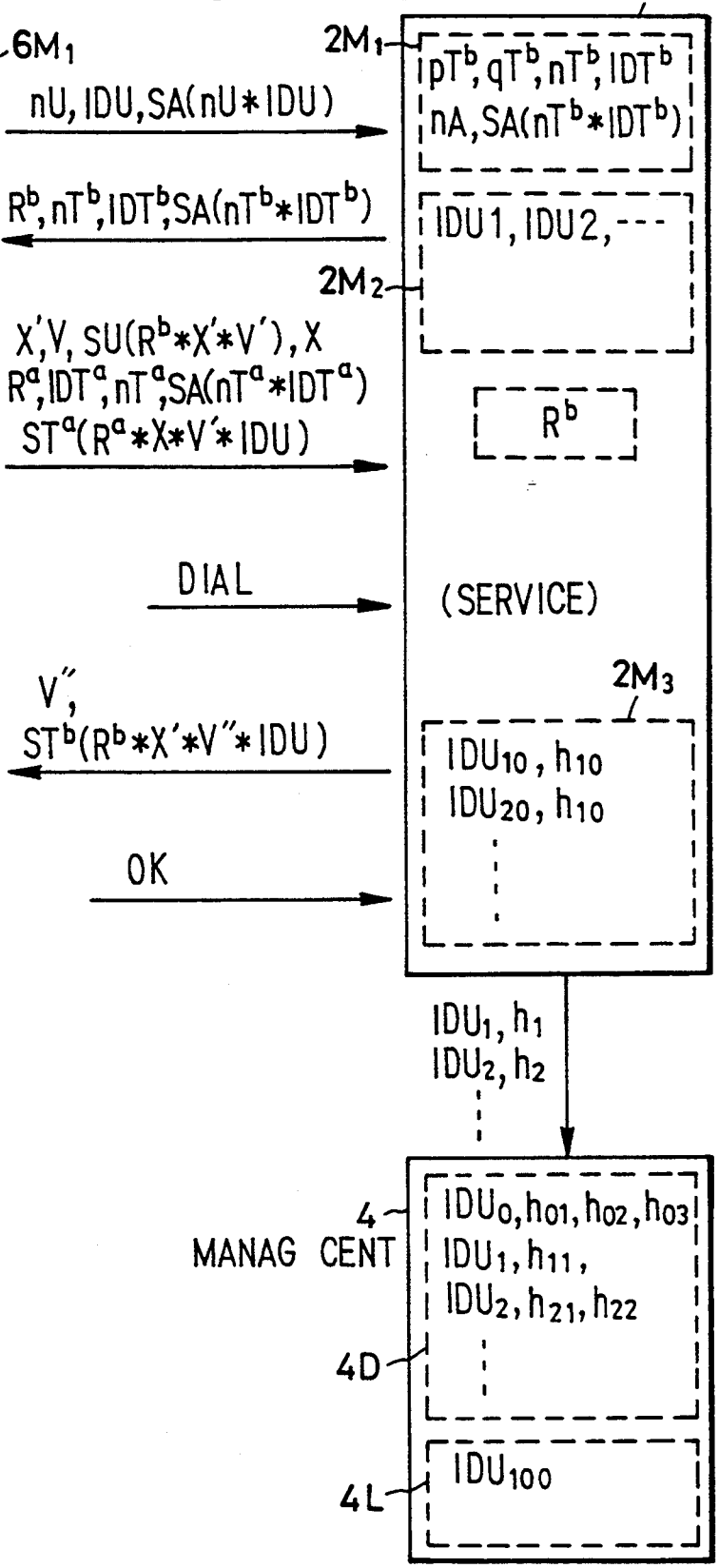
FIG. 9 is a diagram showing the payment of charges by the IC card according to another embodiment of the present invention.

Turning next to FIG. 9, a description will be given of an embodiment of the invention improved from the FIG. 6 embodiment applied to the prepaid card system. As in the FIG. 6 embodiment, the IC card system, each IC card terminal and the IC card are basically identical in configuration with those shown in FIGS. 1, 2 and 3, except that the IC card terminals 2a, 2b, . . . each have a list of invalid IC card identification numbers IDU1, IDU2, . . . prestored in a memory area $2M_2$ of its internal RAM as described later on. The invalid identification number list is written into the memory area $2M_2$ by a down load from the management center 4, for instance, when the IC card terminal 2 is installed, and thereafter the list is updated by the management center 4 as required.

FIG. 9 shows processing for the card user to receive his desired service at the IC card terminal 2b different from that 2a used previously. The pieces of information or data prestored in the card information area $6M_1$ of the EEPROM 64 of the IC card 6 and in the terminal information area $2M_1$ of the RAM in the telephone controller 14 of the IC card terminal 2b are the same as in the case of the FIG. 6 embodiment. In this case, however, symbols representing pieces of information or data inherent to the respective IC card terminals 2a and 2b will be identified by superscripts "a" and "b", respectively. In the usage information area $6M_2$ of the memory 64 of the IC card 6 there is retained the previous usage information, which includes the remaining value V', the terminal identification number $IDT^a$, the terminal public key $nT^a$, the random numbers $R^a$ and X, the master digital signature $SA(nT^a*IDT^a)$ and the terminal digital signature $ST(R^a*X*V'*IDT^a)$ received from the IC card terminal 2a used previously as described in connection with FIG. 6. The IC card terminal 2b has the afore mentioned list of invalid card identification numbers IDU1, IDU2, . . . in another area $2M_2$ of the memory.

When inserted into the IC card terminal 2b different from that used previously, the IC card 6 sends thereto the card identification number IDU, the card public key nU and the master digital signature SA(nU*IDU). The IC card terminal 2b changes the received card identification number IDU with the list of the invalid card identification numbers prestored in the memory area $2M_2$ and, when no match is detected, the IC card terminal 2b verifies the master digital signature SA(nU*IDU). If this signature is valid, the IC card terminal 2b generates a random number $R^b$ and sends it to the IC card 6 together with a terminal public key $nT^b$, a terminal identification number $IDU^b$ and a master digital signature $SA(nT^b*IDT^b)$.

The IC card 6 verifies the master digital signature $SA(nT^b*IDT^b)$ and, if it is valid, generates a random number X' and a card digital signature $SU(R^b*X'*V')$ for the random numbers $R^b$ and X' and the remaining value V' and sends them to the IC card terminal 2b together with the pieces of the previous card usage information or data $R^a$, X, $IDT^a$, $nT^a$, $ST^a(R^a*X*V'*IDU)$ and $SA(nT^a*IDT^a)$.

The IC card terminal 2b verifies the card digital signature $SU(R^b*X'*V')$, and the terminal digital signature $ST^a(R^a*X*V'*IDU)$ and the master digital signature $SA(nT^a*IDT^a)$ of the previous card usage information all received from the IC card 6. When all the digital signatures are valid, the IC card terminal 2b displays the remaining value V' and a guidance or prompt on the display 13. The user specifies his desired service by pressing function buttons 12 and receives the service. Upon completion of the service, the IC card terminal 2b creates a new remaining value V" and a terminal digital signature $ST^b(R^b*X'*V''*IDU)$ and sends them to the IC card 6.

The IC card 6 verifies the terminal digital signature received from the IC card terminal 2b and, if it is valid, then updates the usage information area $6M_2$ with all the pieces of information received from the IC card terminal 2b and sends thereto an authentication signal OK. On the other hand, the IC card terminal 2b then generates usage management information h from the card identification number IDU, the random numbers $R^a$ and X, the terminal identification number $IDT^a$ and the remainder value V' received from the IC card 6 and temporarily records them in another area $2M_3$ of the RAM in the telephone controller 14, together with the card identification number IDU. In this case, the usage management information h may be a numerical sequence composed of, for instance, IDU, $R^a$, X, $IDT^a$ and V', or its data-compressed version by a hash function.

The card identification number and the data of usage information stored in the IC card terminal 2b are sent to the management center 4 at proper time intervals, for example, every day. In the database 4D in the management center 4 there are registered card identification numbers ($IDU_0$, $IDU_1$, $IDU_2$, . . . ) and IC card usage management information ($h_{01}$, $h_{02}$, $h_{03}$ for $IDU_0$, for example) received so far. Upon newly receiving a card identification number and usage management information, the management center 4 first retrieves the card identification number. When the same card identification number is not found, the card identification number and the accompanying usage management information received from the IC card terminal 2b are newly registered. When the same card identification number is found, the usage management information of the card identification number already registered and the usage management information newly received are compared and checked to see if they are the same. If not, the latter is additionally registered as new usage management information. If the same usage management information is found, then the card identification number is registered in the invalid card list 4L (as $IDU_{100}$).

After having registered a card identification number in the invalid card list 4L, the management center 4 calls all of the IC card terminals 2 and transmits the registered card identification number to the IC card terminals 2, wherein it is additionally registered in the invalid card identification number list of the memory area $2M_2$. Hence, when the IC card of that card identification number is used, it can be decided to be abnormal by checking its card identification number and its use can be inhibited. By constructing the management center 4 so that upon registration of the card identification number in the invalid card list 4L, all pieces of data of that card identification number in the database 4D are erased, the data retrieval time can be reduced. Moreover, by constructing the IC card terminal 2 so that it stores new remaining value information as well as the card identification number and the usage/management information and transmits the new remaining value information to the management center 4 together with the usage/management information and by providing a database of remaining value information corresponding to each card identifcation, the remaining value information can be used to specify the remaining value, for example, when the data of the IC card 6 is destroyed.

As will be seen from comparison of FIGS. 4C and 7 with FIGS. 5, 6 and 9, although in the above the IC card 6 does not initially have, for example, the digital signature ST(R*X*V'*IDU) and the terminal public key nT of the IC card terminal 2 in the usage information area $6M_2$ of the EEPROM 64, it is a matter of course that if initial values corresponding to them are recorded in the initial state as well, the usage/management information can be generated from the beginning of the use of the IC card and the whole usage/management information can be held under the control of the management center 4.

While in the above the IC card 6 and the IC card terminal 2 are configured so that they have, in their card information areas $6M_1$ and terminal information area $2M_1$, the secret keys pU, qU and pT, qT for generating digital signatures and the public keys nU and nT for them, respectively, and transmit desired pieces of information together with the digital signatures, it is also possible to omit such a function to simplify the processing of the IC card system.

Also it is possible to omit either one of the random number R and X although security decreases. Conversely, by prestoring algorithms for encipherment of information to be transmitted and a common key for encipherment and decipherment in memories of the IC card 6 and the IC card terminal 2, the mutual communication between them can be made by cipher communication to provide further increased security.

As described above, according to the FIG. 9 embodiment, since particular card information numbers are registered in the card identification number list of the IC card terminal 2, it is possible to inhibit the use of IC cards of the registered card identification numbers. Furthermore, when the IC card 6 is used, at least the terminal identification number identifying the IC terminal used and the random number generated by at least one of the IC card 6 and the IC card terminal 2 are registered as previous information in the IC card 6 and when the IC card 6 is used next, at least the card identification number and usage/management information derived from the card identification number, the remaining value before updating and the previous information are registered and supervised in the management center as information for specifying the initial state of the IC card 6 only in the case of updating the remaining value information. When the card identification number and the usage/management information of the currently used IC card 6 match those already registered, the card identification number is registered as abnormal in the card identification number list of the IC card terminal 2, by which it is possible to inhibit further use of the IC card 6 of the same card identification number as that registered.

Figure 10:
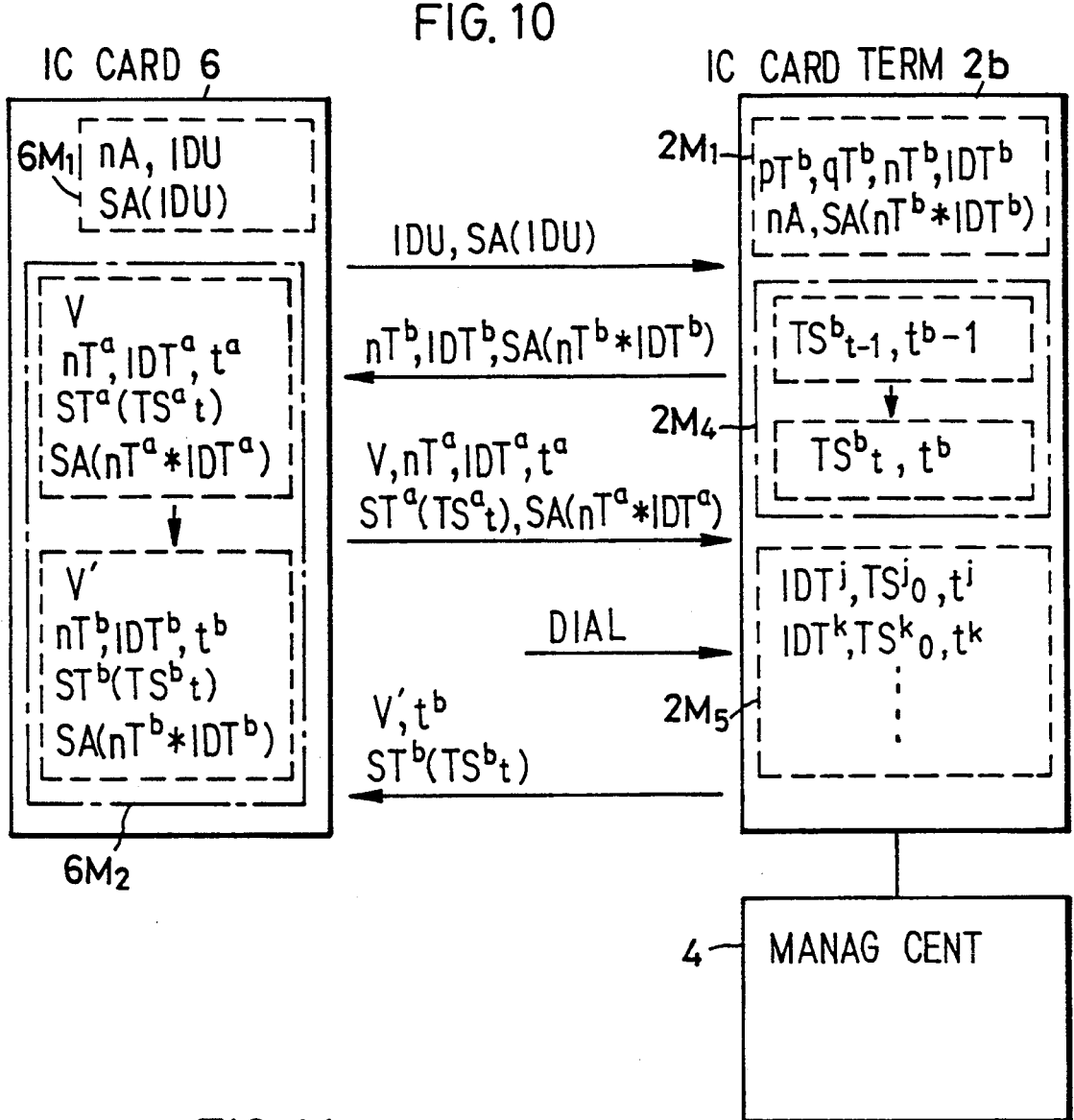
FIG. 10 is a diagram illustrating a modified form of the FIG. 5 embodiment which utilizes a time stamp.

Referring next to FIG. 10, another embodiment of the present invention will be described as being applied to a prepaid card system.

FIG. 10 shows procedures for the payment of charges by the IC card 6 in an improved version of the FIG. 5 embodiment. As in the FIG. 5 embodiment, the IC card system, the IC card terminal 2 and the IC card 6 are basically identical in configuration with those depicted in FIGS. 1, 2 and 3. In this instance, however, the IC card terminal 2 has in the ROM of the telephone controller a program which executes an algorithm for updating a time stamp as described later on. For example, the afore-noted FEAL can be used as the algorithm for updating the time stamp.

The initial value Tgo of the time stamp $TS_0$ may be recorded in a memory area $2M_4$ of the RAM in the telephone controller 14 after being received from the management center 4 via the communication network 3 when the IC card terminal 2 is installed; alternatively, it may also be preset in the memory area $2M_2$ of the RAM in the telephone controller 14 when the IC card terminal 2 is fabricated. Update information t is initialized to a "0", for instance, and it is incremented by 1 upon each updating of the time stamp $TS_t$. In the RAM of the telephone controller 14 there is provided a terminal list area $2M_5$ for registering a list of terminal identification numbers IDT of stolen or similarly troubled IC card terminals, initial values $TS_0$ of the time stamp corresponding to them and the update information t at the time when each trouble was found.

In the configuration of FIGS. 1 through 3, the terminal identification number IDT, the initial value $TS_0$ of the time stamp and the update information t set in each IC card terminal 2 are registered in the management center 4. The time stamp $TS_t$ set in the respective IC card terminal 2 is independently updated by its internal timer from the initial value $TS_0$, for example, every day under a predetermined algorithm; namely, the time stamp is replaced with a new time stamp in a sequential order $[TS_0 \rightarrow TS_1 \rightarrow TS_2 \rightarrow \ldots TS_t \rightarrow \ldots]$, and thus the previous time stamps disappear one after another. The updating of the time stamp need not always be periodic but may also be periodic. Upon each updating of the time stamp, the number of updates (i.e. the update information or data) t is updated to $t+1$. Each time stamp $TS_t$ and the update information t need only to correspond to each other, that is, the time stamp may be a mere symbol and need not be a quantity.

Figure 11:
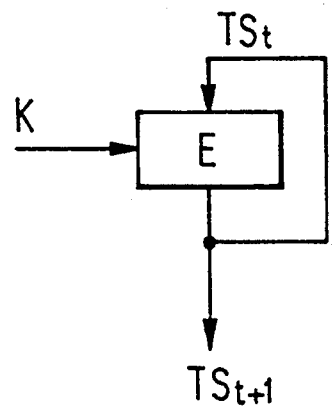
FIG. 11 is a diagram showing a time stamp updating algorithm.

Upon updating the update information t, the IC card terminal 2 automatically calls the management center 4 and transmits thereto the terminal identification number and the renewed update information. The management center 4 replaces the received update information t for the preregistered update information t of the corresponding terminal identification number IDT. Incidentally, it is necessary to utilize, for updating the time stamp $TS_t$, an algorithm which generates the succeeding time stamp $TS_{t+1}$ from the current time stamp $TS_t$ under an encryption algorithm E using an encrypting key K, as exemplified in FIG. 11, to thereby prevent the previous time stamp from generation. The afore-noted algorithm FEAL, for instance, can be used as such an algorithm. The initial value $TS_0$ of the time stamp registered in the management center 4 is not updated. In such a state, when the IC card terminal 2 is stolen, the management center 4 is capable of detecting, from the terminal identification number IDT of the stolen IC card terminal 2, the initial value $TS_0$ of the time stamp of the stolen IC card terminal 2 and the update information t of the time stamp at the time when the IC card terminal 2 was stolen. These pieces of information or data are registered in the terminal list of all IC card terminals 2 by a down load from the management center 4.

FIG. 10 is explanatory of the processing for the user to receive his desired service at the IC card terminal 2b through use of the IC card 6. In the FIG. 10 embodiment, however, the IC card 6 side has no digital signature generating function. In the card information area $6M_1$ of the EEPROM 64 of the IC card 6 there are stored the master public key nA, the card identification number IDU and the master digital signature SA(IDU) and in the usage information area $6M_2$ there are stored the remaining value V, the terminal identification number $IDT^a$, the terminal public key $nT^a$, the update information $t^a$, the terminal digital signature $ST^a(TS^a_t)$ for the time stamp $TS^a_t$ and the master digital signature $SA(nT^a*IDT^a)$ which are the card usage information received from the IC card terminal 2a previously used. In this example the master digital signature SA(IDU) held in the IC card 6 is shown to be a master digital signature for only the identification number of the IC card, but it is also possible to use a master digital signature SA(IDU*mU) for the concatenation of the identification number IDU and predetermined information mU.

In the terminal information area $2M_1$ of the RAM in the telephone controller 14 of the IC card terminal 2b there are stored the terminal identification number $IDT^b$, the terminal secret keys pT and qT for creating the digital signature, the terminal public key $nT^b$, the master public key nA and the master digital signature $SA(IDT^b*nT^b)$ and in another predetermined area $2M_4$ there are recorded the latest time stamp $TS^b_t$ and the update information $t^b$ of the IC terminal 2b. In still another area $2M_5$ of the RAM in the IC card terminal 2b there are recorded, as a table, terminal identification numbers $IDT^j$, $IDT^k$, . . . of stolen or similarly troubled IC card terminals, their time stamps $TS^j_0$, $TS^k_0$, . . . , and update information $t^j$, $t^k$, . . . at the points when they were found, which are provided from the management center 4.

When inserted into the IC card reader/writer 11 of the IC card terminal 2b, the IC card 6 sends thereto the identification number IDU and the master digital signature SA(IDU) as in the embodiments described above. The IC card terminal 2b verifies the received master digital signature SA(IDU) by use of the master public key nA and, if it is valid, then sends the identification number $IDT^b$ the terminal public key $nT^b$ and the master digital signature $SA(IDT^b*nT^b)$ of the IC card terminal 2b itself to the IC card 6. Then the IC card 6 verifies the validity of the received master digital signature $SA(IDT^b*nT^b)$ by use of the master public key nA. The process performed so far is the same as in the embodiment of FIG. 5.

When the master digital signature $SA(IDT^b*nT^b)$ is valid, the IC card 6 sends pieces of the previous card usage information V, $IDT^a$, $t^a$, $nT^a$, $ST^a(TS^a_t)$ and $SA(nT^a*IDT^a)$ to the IC card terminal 2b. The IC card terminal 2b compares the received card identification number $IDT^a$ with each piece of the data $IDT^j$, $IDT^k$, . . . in the troubled terminal list and, when they do not match, displays remaining value V and a guidance or prompt on the display 13. When the user specifies his desired service by pressing the function buttons 12 while referring to the guidance displayed on the display 13, the IC card terminal 2b reads out the charge v for the specified service from a list prestored in a memory of the telephone controller 14 or receives the charge v from the service center (not shown) via the communication network 3. Then the IC card terminal 2b compares the charge v and the remaining value V and starts to provide the specified service when the remaining value V is larger than the service charge v. Upon completion of the service, the IC card terminal 2b subtracts the service charge v from the remaining value V to obtain a new remainder value V' and generates a digital signature $ST^b(TS^b_t)$ for the current time stamp $TS^b_t$ by use of the terminal secret or private keys $pT^b$ and $qT^b$ and sends it to the IC card 6 together with the pieces of data V' and $t^b$. The IC card 6 updates the usage information area $6M_2$ in the EEPROM 64 with all the pieces of information received from the IC card terminal 2b together with the remaining value V'.

In the above processing, when the terminal identification number $IDT^b$ sent to the IC card terminal 2b matches with any one of those in the troubled terminal list, the following processing is performed.

(1) Let $IDT^j$ represent the terminal identification number in the list that matched the terminal identification number $IDT^b$ sent to the IC card terminal 2b. The initial value $TS^j_0$ of the time stamp corresponding to the terminal identification number $IDT^j$ is recursively calculated by the number of updating of the update information $t^a$ received from the IC card 6 under the algorithm of FIG. 11 registered as a program of the IC card terminal 2b, and the time stamp $TS^j_t$ corresponding to the update information $t^a$ is obtained as follows:

$$TS^j_0 \rightarrow TS^j_1 \rightarrow TS^j_2 \rightarrow \ldots \rightarrow TS^j_t$$

(2) The IC card terminal 2b verifies the validity of the signature $ST^a(TS^a_t)$ by use of the time stamp $TS^j_t$ obtained by the above calculation and the public key $nT^a$ received from the IC card 6.

(3) When the digital signature is not valid, the IC card terminal 2b decides that the IC card 6 is abnormal or invalid and stops further processing, then ejecting or returning the IC card 6 to the user.

(2) When the digital signature is valid, the IC card terminal 2b compares update information $t^j$ corresponding to the above-noted terminal identification number $IDT^j$ in the troubled terminal list and the update information $t^a$ received from the IC card 6.

(5) When $t^a \leq t^j$, the update information $t^a$ is judged as update information generated before the pieces of data $IDT^j$, $TS^j_0$ and $t^j$ were registered in the terminal list; that is, the IC card 6 is judged to be an IC card whose card usage information (terminal identification number $IDT^j$, update information $t^j$, public key $nT^j$ and digitally-signed time stamp $ST^j(TS^j_t)$) in the usage information area $6M_2$ had been updated by a stolen IC card terminal 2j (not shown) of the identification number $IDT^j$ before it was stolen. As the result of this, the IC card terminal 2b regards the IC card 6 as valid and performs the subsequent processing accordingly.

(6) When $t^a > t^j$, the update information $t^a$ is judged as update information generated after the pieces of data $IDT^j$, $TB^j{}_0$ and $t^j$ were registered in the troubled terminal list; that is, the IC card 6 is judged to be an IC card whose card usage information was updated by the IC card terminal $2j$ of the identification number $IDT^j$ after it had been stolen. As the result of this, the IC card terminal $2b$ regards the IC card 6 as invalid and discontinues the process and ejects or detains the IC cards in the IC card terminal $2b$.

Figure 12:
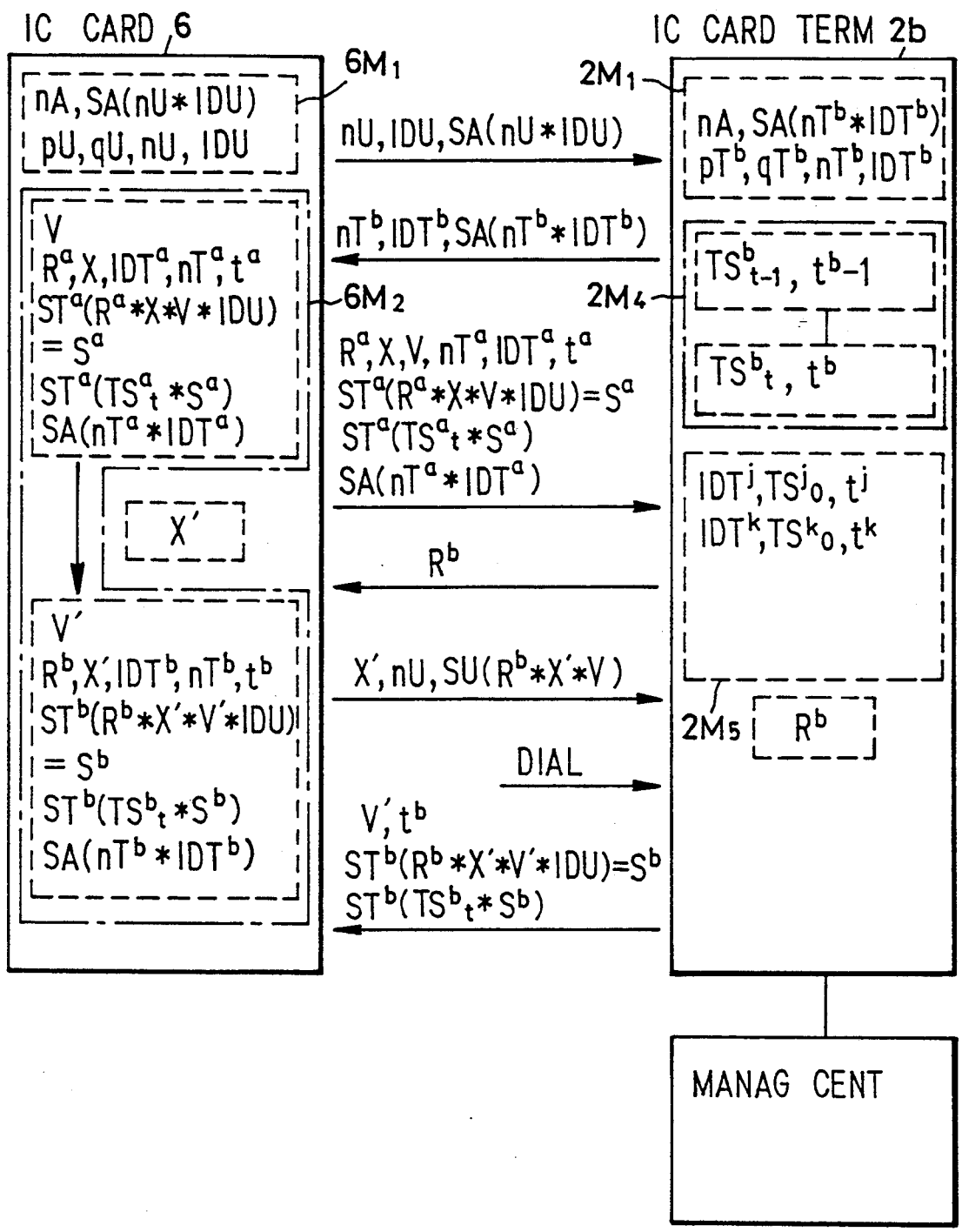
FIG. 12 is a diagram illustrating a modification of the FIG. 10 embodiment which employs random numbers.

FIG. 12 illustrates another embodiment of the invention which provides further increased security through use of random numbers in the FIG. 10 embodiment as in FIG. 6. In a ROM 61 of the IC card 6 there are recorded an algorithm for generating the digital signature and an algorithm for generating the random numbers. In the card information area $6M_1$ in the EEPROM 64 of the IC card 6 there are stored the information in the card information area $6M_1$ in FIG. 10, together with the card secret keys pU and qU and the public key nU for the verification of the digital signature. In this case, however, the master digital signature used is $SA(IDU*nU)$. In the usage information area $6M_2$ in the EEPROM 64 there are held all pieces of card usage information received from the previously used IC card terminal $2a$, that is, the terminal identification number $IDT^a$, the public key $nT^a$, the master digital signature $SA(nT^a*IDT^a)$ for them, the update information $t^a$, the random number $R^a$, the previously generated random number X, a first digital signature $ST^a(R^a*X*V*IDU)=S^a$ generated by the previously used IC card terminal $2a$ for the random numbers $R^a$ and X, the remaining value V and the card identification number IDU, and a second digital signature $ST^a(TS^a{}_t*S^a)$ generated by the previously used IC card terminal $2a$ for the first digital signature $S^a$ and the time stamp $TS^a{}_t$.

When inserted into the IC card reader/writer 11 of the IC card terminal $2b$, the IC card 6 sends thereto the card identification number IDU, the public key nU and the master digital signature $SA(IDU*nU)$ as in the case of FIG. 10, and the IC card terminal $2b$ verifies the master digital signature $SA(IDU*nU)$ by use of the public key nU. When the master digital signature is valid, the IC card terminal $2b$ sends the terminal identification number $IDT^b$, the public key $nT^b$ and the master digital signature $SA(IDT^b*nT^b)$ to the IC card 6. The IC card 6, in turn, verifies the master digital signature $SA(IDT^b*nT^b)$ and, if valid, sends to the IC card terminal $2b$ the pieces of data $R^a$, X, V, IDU, $S^a$, $IDT^a$, $t^a$, $SA(nT^a*IDT^a)$, $nT^a$ and $ST^a(TS^a{}_t*S^a)$ which are the previous card usage information.

Then the IC card terminal $2b$ verifies the validity of the first digital signature $S^a$ by use of the public key $nT^a$. When the signature $S^a$ is valid, the IC card terminal $2b$ compares the received terminal identification number $IDT^a$ with data in the troubled terminal list, and if the former does not match the latter, the IC card terminal $2b$ generates the random number $R^b$ and sends it to the IC card 6. In response to this, the IC card 6 generates the random number X' and generates a digital signature $SU(R^b*X'*V)$ for the random numbers $R^b$ and X' and the remaining value V by use of the secret keys pU and qU, then sends it to the IC card terminal $2b$ together with the random number X' and the card public key nU. The IC card terminal $2b$, in turn, checks the validity of the received digital signature $SU(R^b*X'*V)$ by use of the public key nU also received from the IC card 6. When the digital signature is valid, the IC card terminal $2b$ displays the remaining value V on the display 13 and then provides a predetermined service. After completion of the service the IC card terminal $2b$ obtains the new remaining value V' and generates a first digital signature $ST^b(R^b*X'*V'*IDU)=S^b$ for the random numbers $R^b$ and X', the remaining value V' and the card identification number IDU by use of the terminal secret keys $pT^b$ and $qT^b$ and, at the same time, generates a second digital signature $ST^b(TS^b{}_t*S^b)$ for the time stamp $TS^b{}_t$ and the first digital signature $S^b$, thereafter sending them to the IC card 6 together with the new remaining value V' and the update information $t^b$. The IC card 6 checks the validity of the received first digital signature $S^b$ by use of the terminal public key $nT^b$ also received from the IC terminal $2b$ and, if it is valid, then updates the usage information area $6M_2$ with the whole information received from the IC terminal $2b$. In the event that the validity of the digital signature cannot be verified in the above, the IC card terminal $2b$ stops processing at that point and ejects or returns the IC card 2.

In the case where the data $IDT^j$ that matches the data $IDT^a$ sent to the IC card terminal $2b$ is found in the troubled terminal list, the same process as described previously is performed. In this embodiment, since the random numbers R and X, generated by the IC card terminal 2 and the IC card 6, are utilized in the transmission and reception of information between them, the contents of signals will not ever become the same; hence it is possible to prevent an abuse using an intercepted signal. Moreover, since the IC card 6 and the IC card terminal 2 not only conduct mutual verification of the master digital signature but also generates their own digital signatures and mutually verify them, the system security can be further increased.

Also in the embodiment of FIG. 12, by prestoring algorithms for encryption and decryption of transmission data and common encrypting and decrypting keys in the memories of the IC card 6 and the IC card terminal 2, the communication between them can be made by a cipher communication—this also provides further increased security.

As described above, according to the embodiment of FIGS. 10 and 12, when the IC card 6 is used, the terminal identification number of the IC card terminal 2 used, the public key for verifying the digital signature generated by the IC card terminal 2, the digital signature produced by the IC card terminal 2 for the time stamp at the time of the use of the IC card 6 and update information of the time stamp are recorded as card usage information in a predetermined memory area in the IC card 6. When the IC card 6 is used next at a different IC card terminal 2, the IC card 6 sends thereto the card usage information recorded in the above-said memory, and the IC card terminal 2 specifies the previously used IC card terminal on the basis of the terminal identification number in the card usage information sent from the IC card 6. The IC card terminal 2 compares the specified terminal number with those registered in the terminal list in the IC card terminal 2, and if the specified terminal number matches any one of the registered numbers, then the IC card terminal 2 will read out of the terminal list the initial value of the time stamp corresponding to the registered terminal number and the update information also corresponding thereto.

The IC card terminal 2 updates the initial value of the time stamp by a predetermined algorithm on the basis of the update information received from the IC card 6 to obtain the time stamp of the IC card terminal at the time when it was used previously. The IC card terminal 2 verifies the validity of the digital signature for that time stamp by use of the time stamp itself and the public key received from the IC card 6 to ensure that the update information received from the IC card 6 is valid. When the update information is valid, the IC card terminal 2 matches it with the pieces of update information recorded in the afore-said terminal list to make a check to see if the time of the previous use of the IC card at the IC card terminal 2, registered in the above-mentioned terminal list of the IC card 6 goes before or comes after the time when the terminal number was registered in the terminal list. If the IC card terminal 2 fails to verify the validity of the digital signature, it will judge that the update information or digital signature received from the IC card 6 is not normal or valid information and processes the IC card as an abnormal or invalid card. Furthermore, if the terminal identification number of the IC card terminal 2 is specified in the management center 4, the initial value of the time stamp of the IC card terminal of the specified terminal identification number and the update information at that time point can be known and these pieces of information can be registered in the terminal list of the IC card terminal 2.

Next, a description will be given of an embodiment wherein the IC card of the present invention is applied to a credit card. In this embodiment the IC credit card system to which the IC card and the IC card terminal of the present invention are applied has the same configuration as shown in FIG. 1. The IC card terminals $2a$, $2b$, ... perform the verification processing by use of the IC card 6 and provide various services. The management center 4 holds the charges for the services used by the IC card 6. Each IC card terminal 2 stores in its memory the identification numbers of the IC cards used at that terminal and the charges for the services rendered and automatically calls the management center 4 at regular time intervals, for example, every day and transmits the stored information to the management center a 4 via the communication network 3. The management center 4 sums up the charges for each card identification number and demands payment of each user every month, for instance. The internal constructions of each IC card terminal 2 and the IC card 6 are the same as shown in FIGS. 2 and 3.

Figure 13:
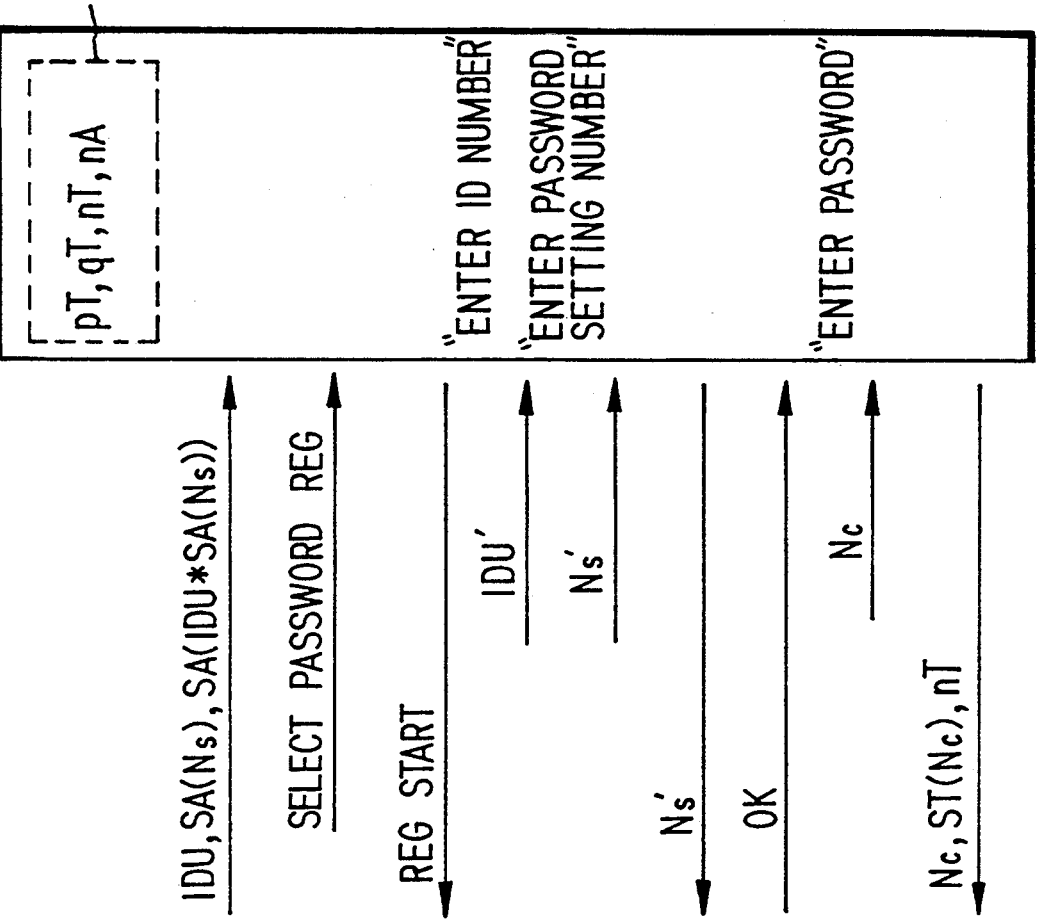
FIG. 13 is a diagram showing procedures for registering a password in an IC card applied to a credit card, by use of the IC card terminal.

FIG. 13 is a diagram for explaining the procedure for the user to register a password in the IC card 6 by use of the IC card terminal 2. In the card information area $6M_1$ of the EEPROM 64 of the IC card there are written, at the time of issuing the IC card 6 from the IC card dispenser 5, the identification number IDU for specifying the user, a password setting number Ns assigned to each user, a master digital signature SA(Ns) generated by the management center 4 for the password setting number Ns by use of a master key, and master digital signature SA(IDU*SA(Ns)) generated by the management center 4 for the identification number IDU and the master digital signature SA(Ns) by use of the master key. When these pieces of data are written, the validity of the password setting number Ns can be checked through verification of the master digital signature SA(Ns) by use of the public key nA.

In the terminal information area $2M_1$ of the RAM in the telephone controller 14 of the IC card terminal 2 there are prestored the master public key nA for verifying the master digital signatures created by use of the master key, the terminal secret keys pT and qT for generating the digital signature by the IC card terminal 2 and the terminal public key nT for verifying the digital signature created by the IC card terminal 2.

When inserted into the IC card reader/writer 11 of the IC card terminal 2, the IC card 6 sends thereto the identification number IDU, the master digital signature SA(Ns) and the digital signature SA(IDU*SA(Ns)). The IC card terminal 2 verifies, in turn, the digital signature SA(IDU*SA(Ns)) by use of the master public key nA to ensure the validity of the identification number IDU. If the identification IDU is judged to be invalid, then the IC card 6 is ejected or returned and the process is discontinued. When the identification number IDU is judged to be valid, a prompt for the "input of password" is displayed on the display 13. During the display of this prompt the input of a password is enabled and the selection of the password registration by pressing a particular one the function buttons 14 is made effective.

Upon selective pressing of the password registration command button among the function buttons 14, the IC card terminal 2 proceeds to the password registration process. The IC card terminal 2 sends a notice of the password registration to the IC card 6 to indicate thereto the start of the password registration process, while at the same time the IC card terminal 2 provides a display "ENTER IDENTIFICATION NUMBER" on the display 13 to urge the user to enter the identification number. Upon entering of the identification number IDU' by the user with pushbuttons, the IC card terminal 2 compares it with the identification number IDU previously received from the IC card 6 to check the validity of the identification number IDU' input by the user. When the two identification numbers do not match, the IC card terminal urges again the user to input the identification number. If the identification number IDU' does not match the previous IDU even after being entered three times, for instance, the IC card terminal 2 judges that the IC card 6 is abused, and ejects it and discontinues the process. When the identification numbers match, the IC card terminal 2 produces a display "ENTER PASSWORD SETTING NUMBER" on the display 13, prompting the user to enter the setting number.

Upon entering the setting number Ns' by the user with pushbuttons, the IC card terminal 2 sends the setting number Ns' to the IC card 6. The IC card 6 compares the currently received setting number Ns' with the setting number Ns prestored in the afore mentioned memory to check the validity of the setting number Ns' entered by the user. If they not match, the IC card 6 sends a mismatch notice to the IC card terminal 2, which urges again the user to enter the setting number. In the event that the current setting number does not match the previous one even after being entered three times, for example, the IC card terminal 2 judges that the IC card 6 being used is abused and ejects it and discontinues the process. When the setting numbers match, the IC card 6 sends an authentication signal OK (a first authentication notice) to the IC card terminal 2. The IC card terminal 2 provides a display "ENTER PASSWORD" on the display 13, prompting the user to enter the password. Upon entering of the password Nc by the user with pushbuttons, the IC card terminal 2 creates a digital signature ST(Nc) for the password Nc by use of the terminal secret keys pT and qT and sends the digital signature ST(Nc) and the terminal public key nT to the IC card 6 together with the password Nc. The IC card 6 verifies the digital signature ST(Nc) by use of the terminal public key nT to check the validity of the password Nc. When the password Nc is valid, it is recorded in the RAM 62. The IC card 6 becomes enabled for use only after the password Nc is thus registered therein.

While in the above the setting number Ns' is verified on the IC card 6, it can also be checked at the IC card terminal 2 if the setting number Ns is also sent to the IC card terminal 2 together with the card identification number IDU at the beginning. However, this procedure is not preferable from the viewpoint of security, because the setting number Ns—information that must be kept strictly secret—is transmitted from the IC card 6. Besides, in the case where the identification number or setting number, entered by pushbuttons, do not match the previous one even after being entered three times, the IC card 6 could be disabled for further use by writing thereinto to the effect that the IC card 6 is invalid or abused.

Figure 14:
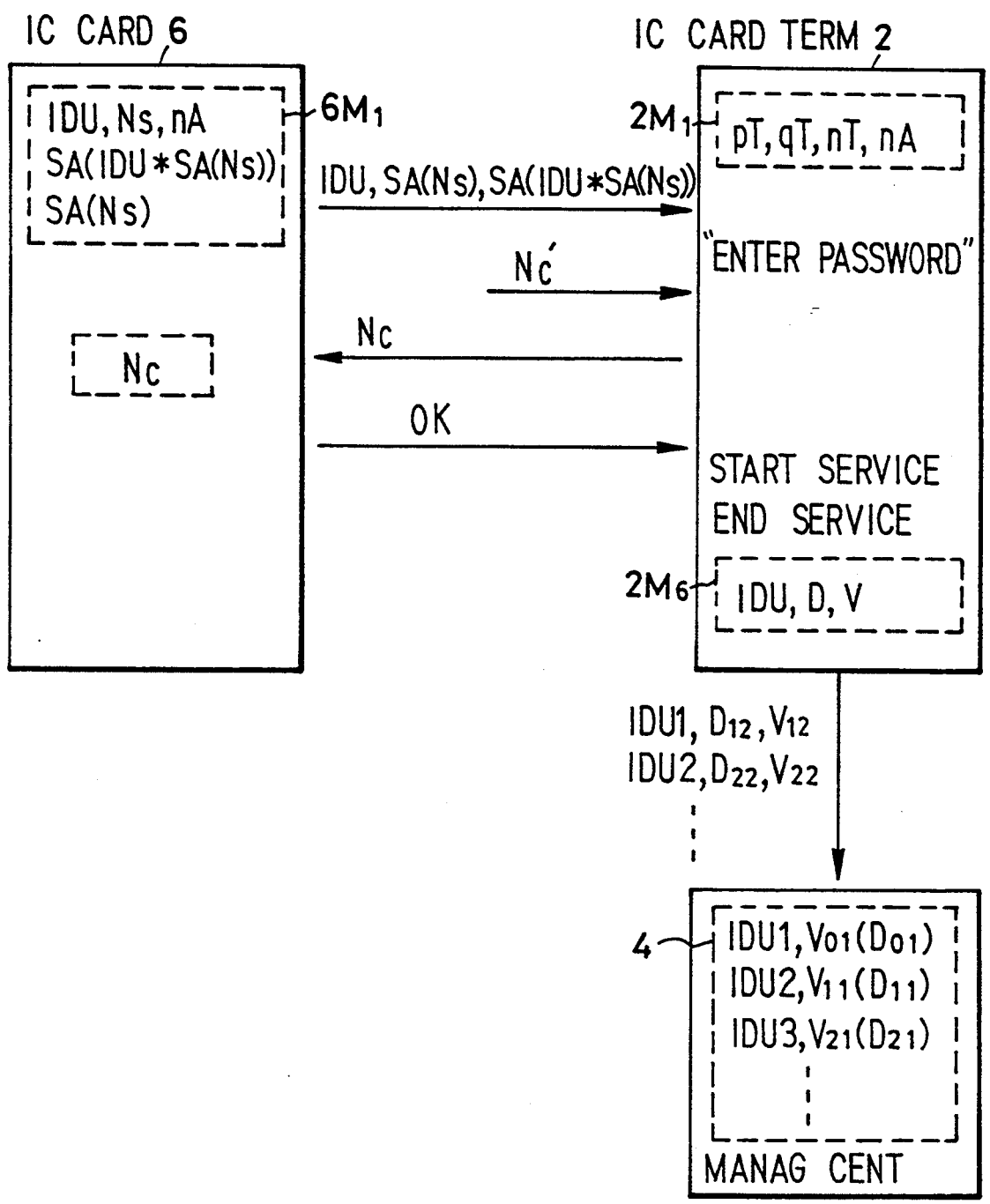

FIG. 14 is a diagram for explaining the process in which the user receives a service at the IC card terminal 2 through use of an IC card 6 which is a credit card. In the RAM 62 of the IC card 6 there is recorded the password Nc in the manner described above. When inserted into the IC card reader/writer 12 of the IC card terminal 2, the IC card 6 sends thereto the identification number IDU and the master digital signatures SA(Ns) and SA(IDU*SA(Ns)). The IC card terminal 2 verifies the digital signature SA(IDU*SA(Ns)) by use of the master public key nA to check the validity of the identification number IDU. When the identification number IDU is not valid, the IC terminal 2 ejects the IC card 6 and discontinues the process. When the identification number is valid, the IC card terminal 2 provides a display "ENTER PASSWORD" on the display 13. While this display is being provided, the entering of the password is allowed or enabled and the re-registration of the password by pressing the function buttons 14 is also effective. In other words, if desired, the password can be changed. At this time, when the user dials the password Nc', it is sent to the IC card 6 wherein it is compared with the prestored password Nc. When they do not match, the IC card 6 sends a mismatch notice to the IC card terminal 2, which prompts the user to re-enter the password. In the event that the password does not match the prestored one even after being entered three times, for example, the IC card terminal 2 judges that the IC card 6 is invalid, then ejects it and discontinues the processing.

When the password matches the prestored one, the IC card 6 sends an authentication signal OK (a second authentication notice) to the IC card terminal 2, which, in turn, provides on the display 13 an indication that the user's specified service is possible, and then provides the service. For instance, in the case of a communication service by telephone, the IC card terminal 2 displays that the telephone number of the other party to be called can be dialed, and then connects the user to the party of the number dialed by the user. Thus, the user is allowed to receive the communication service and upon completion of the service the IC card terminal 2 records, in the service information area $2M_6$ of its internal memory, the identification number IDU identifying the user, the date of use D and the charge V and then ejects the IC card 6, completing the process. The data stored in the internal memory is transmitted to the management center a once or twice daily, for example. The management center 4 sums up the charges for each identification number and submits bills to the users and receives payments therefrom every month.

Figure 15:
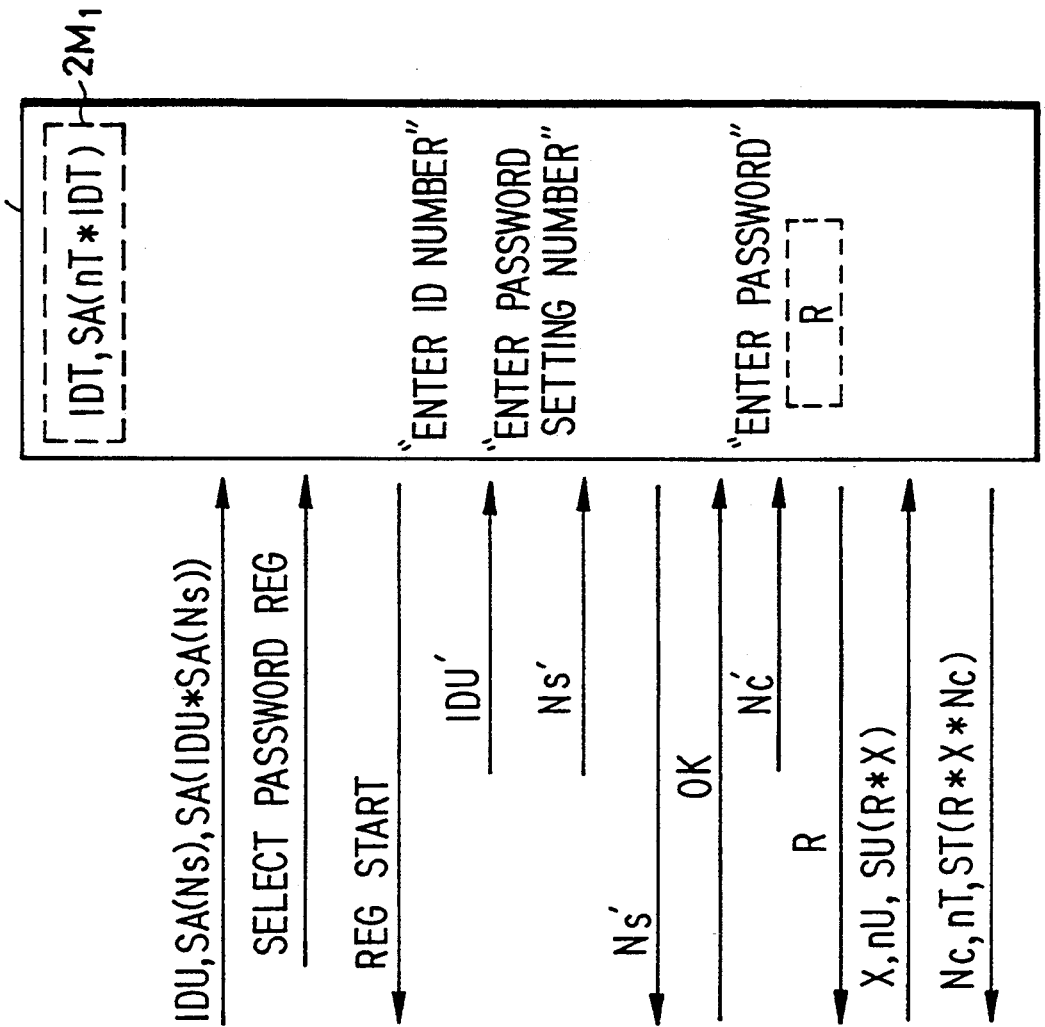
FIG. 15 is a diagram showing another example of the password registration procedure.
Figure 15:
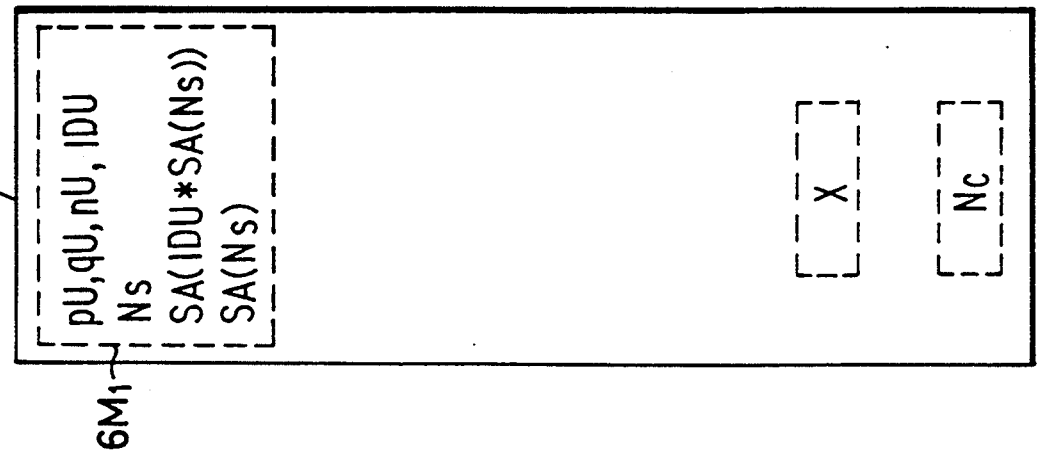

FIG. 15 is a diagram illustrating another embodiment of the present invention which provides increased security of the password registration process shown in FIG. 13. In the card information area $6M_1$ in the EEPROM 64 of the IC card 6 there are stored the card secret keys pU and qU used for generating the digital signature by the IC card 6 and the card public key nU used for verifying the digital signature created by the IC card 6 as well as the pieces of information or data IDU, Ns, SA(Ns) and SA(IDU*SA(Ns)) shown in the corresponding area in FIG. 13. Furthermore, the IC card 6 and the IC card terminal 2 each have a random number generating program stored in its memory. In the password registration process, when the user enters the password Nc by pushbuttons after the verification of the identification number IDU' and the setting number Ns' by the above-described procedures, the IC card terminal 2 creates the random number R and sends it to the IC card 6. The IC card 6, in turn, creates the random number X and then generates a digital signature SU(R*X) for the random numbers R and X by use of the card secret keys pU and qU, thereafter sending the random number X and the card public key nU to the IC card terminal 2 together with the digital signature SU(R*X).

The IC card terminal 2 verifies the digital signature SU(R*X) by use of the card public key nU to determine whether the IC card 6 is valid. When the IC card is found to be valid the IC card terminal 2 creates a digital signature ST(R*X*Nc) for the random numbers R and X and the password Nc by use of the terminal secret keys pT and qT and transmits the terminal public key nT and the password Nc to the IC card 6 together with the digital signature ST(R*X*Nc). The IC card 6 verifies the digital signature ST(R*X*Nc) by use of the terminal public key nT to ensure that the IC card terminal 2 and the password Nc are valid, and records the password Nc in the RAM 62. In this embodiment, since the random numbers generated by the IC card terminal 2 and the IC card 6 are used in the transmission and reception of data between them, the signals used will not ever have the same contents—this prevents an abuse of the system through utilization of an intercepted signal. Moreover, the IC card terminal 2 and the IC card 6 create digital signatures and verify them by each other, providing increased security.

Figure 16:
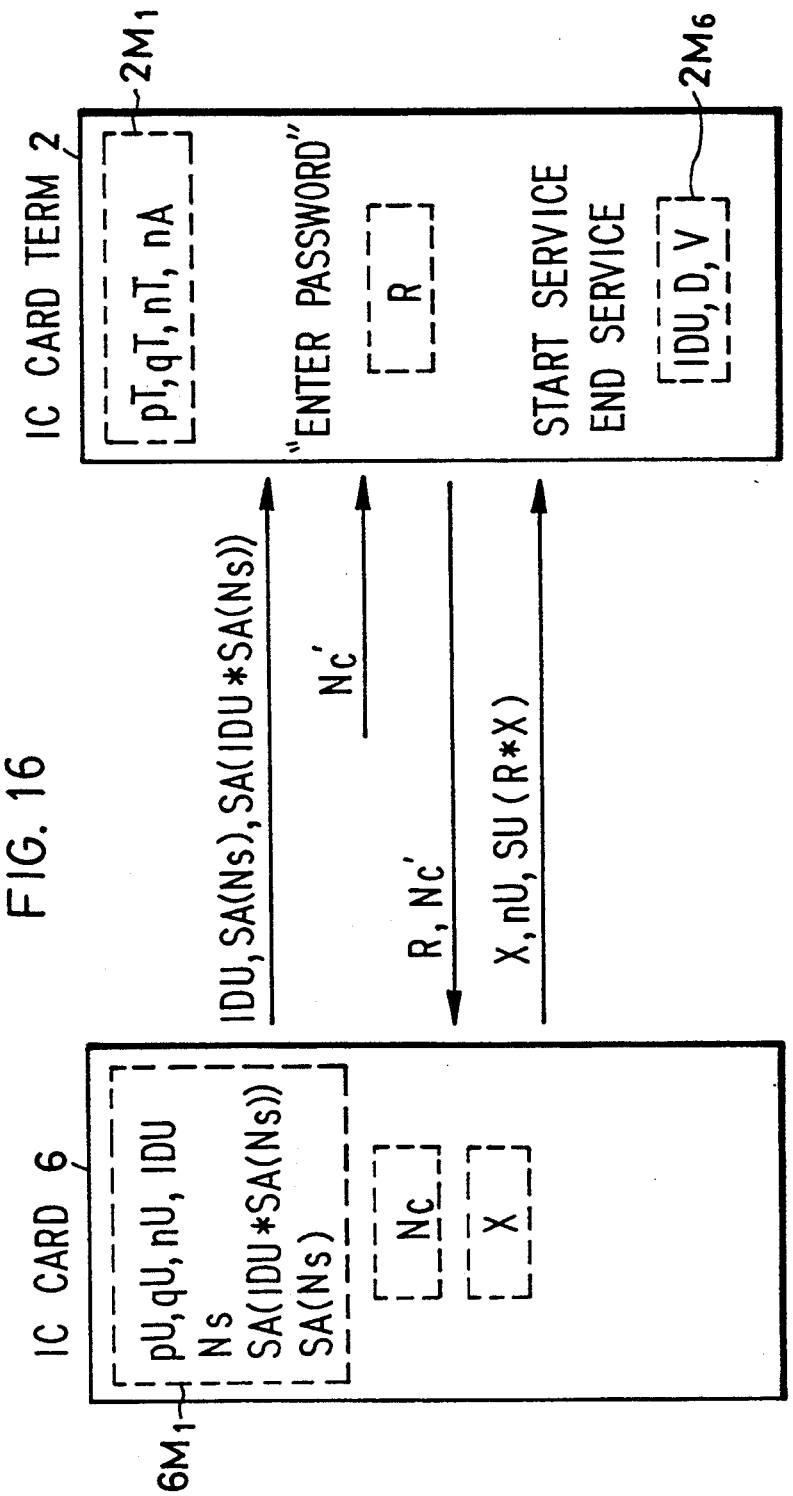
FIG. 16 is a diagram showing procedures for receiving a service by use of an IC card with the password registered therein by the process depicted in FIG. 15.

FIG. 16 is a diagram showing another example of the process for receiving a service at the IC card terminal 2 through use of the IC card described previously with reference to FIG. 14. When the user enters the password Nc' by pushbuttons after he inserted the IC card 6 into the IC card terminal 2 and the identification number IDU was verified by the procedure as described previously in respect to FIG. 14, the IC card terminal 2 generates the random number R and sends it to the IC card 6 together with the password Nc'. The IC card 6 compares the received password Nc' with the password Nc stored in the memory and, if they match each other, the IC card terminal 2 generates the random number X and creates the digital signature SU(R*X) for the random numbers R and X by use of the card secret keys pU and qU, thereafter sending the random number X and the card public key nU to the IC card terminal 2 together with the digital signature SU(R*X).

The IC card terminal 2 verifies the digital signature SU(R*X) by use of the card public key nU and judges that the IC card 6 and the password are both valid, and then the IC card terminal 2 provides on the display 13 an indication that the service specified by the user is possible and executes the service. Upon completion of the service, the IC card terminal 2 records the identification number identifying the user, the data of use D and the service charge V in the service information area $2M_6$ in its internal memory and then ejects the IC card 6, thus completing the process. As is the case with the FIG. 14 embodiment, the data in the service information area $2M_6$ is transmitted to the management center 4 periodically, or when the amount of data stored reaches a fixed value, or when the IC card terminal 2 is polled by the management center 4.

In the above, if the card identification number IDU for specifying the IC card 6 and the master digital signature SA(IDU) for the card identification number IDU created by the management center 4 by use of the master key are registered in the EEPROM 64 of the IC card 6 when the IC card 6 is issued by the management center 4, and also if the card identification number IDU is sent together with the master digital signature (SA(IDU) to the IC terminal 2 when the IC card 6 is inserted into the IC card terminal 2, then the IC card terminal 2 can verify the master digital signature SA(IDU) by use of the master public key to check the validity of the card identification number. As a result, it is possible to deal with the loss of the IC card 6 or similar trouble. In other words, when the user reports the loss of the IC card 6 to the management center 4, the latter registers the card identification number of that IC card 6 in a black list in the IC card terminal 2 by down load. The IC card terminal 2 compares the card identification number IDU with those in the black list when the IC card 6 is inserted thereinto. If the card identification number of the inserted IC card 6 matches any one of the identification numbers registered in the black list, then the IC card 6 can be inhibited from use.

With a system configuration in which date information is prestored in the EEPROM 64 of the IC card 6 and sent to the IC card terminal 2 together with the card identification number IDU when the IC card 6 is inserted thereinto and compared with a calendar incorporated in the IC card terminal 2 to judge whether the IC card 6 can be used or not, it is possible to employ the IC card 6 as a card having a limited term of validity.

By storing algorithms for encryption of transmission data and common keys for encryption and decryption in both of the IC card 6 and the IC card terminal 2, the communication between them can be made as a cipher communication, providing increased security.

As will be seen from the above, in the case of employing the IC card 6 and the IC card terminal 2 in the embodiments of FIGS. 13 through 16, the IC card 6 and the IC card terminal 2 mutually verify their validity and the validity of the user is verified by the IC card 6 through the IC card terminal 2—this eliminates the need of accessing the management center having a database concerning user information when receiving a service or setting a password, and hence permits easy system configuration. Since there is no need of accessing the management center, the verification time can be reduced and the operability of the system is increased. Moreover, since the identification number is verified on the basis of the digital signature created by use of the master key that is known to the management center alone, the digital signature could never be created using the identification number of another user, for example. Further, the password cannot be known from an IC card picked up and the identification number and the setting number are also unknown; hence, the password cannot be changed either. It is possible, therefore, to construct a system of excellent security.

FIG. 17 illustrates a modified form of the IC card system shown in FIG. 16. The IC card terminal 2 and the IC card 6 are identical in their internal construction with those depicted in FIGS. 2 and 3. In the card information area $6M_1$ in the EEPROM 64 of the IC card 6 there are prestored, at the time of issuing the IC card 6, the secret keys pU and qU for the creation of its digital signature, the public key nU for verifying the digital signature, the IC card identification number IDU and the master digital signature SA(nU*IDU) of the management center 4 for the identification number IDU and the public key nU. The IC card 6 has the password Nc stored therein by the process described previously with respect to FIG. 15 or 17. The identification number IDU of the IC card 6 is prestored in the management center 4. The user inserts the IC card 6 into the IC card terminal 2 when he wishes to receive a desired service. After completion of the service, the management center 4 performs the charging process for the IC card 6 used.

When inserted into the IC card reader/writer 11 of the IC card terminal 2, the IC card 6 sends thereto the pieces of information nU, IDU and SA(nU*IDU). The IC card terminal 2 verifies the master digital signature SA(nU*IDU) by use of the master public key nA and, if it is valid, provides a guidance on the display 13 to prompt the user to enter the password Nc.

When the user enters the password Nc' by use of function buttons 12, the IC card terminal 2 sends the entered password Nc' and the random number R, generated by the IC card terminal 2, to the IC card 6. The IC card 6 compares the received password Nc' with the password Nc prestored in the memory. When they match each other, the IC card 6 generates the random number X and creates the digital signature SU(R*X*Nc) for the random numbers R and X and the password Nc by use of the secret keys pU and qU stored in the card information area $6M_1$ in the EEPROM 62. The digital signature SU(R*X*Nc) thus created is transmitted to the IC card terminal 2 together with the random number R.

The IC card terminal 2 verifies the digital signature SU(R*X*Nc) by use of the card public key nU also received from the IC card 6 and, if the digital signature is valid, then displays a guidance on the display 13 to prompt the user to specify the service to be provided. In the case of a communication service by telephone, the user enters the telephone number of the other party's telephone (not shown) by depressing the function buttons 12, after which a call to the other party's telephone is originated. Upon completion of the call or communication, the IC card terminal 2 transmits to the IC card 6 information which is used to deal with a trouble, such as the service charge V, the data D and the terminal identification number IDT, and service information M=(V*D*IDT) which the user wants to make sure afterward. The IC card 6 stores the service information M in the EEPROM 64 and creates and sends a digital signature SU(M*IDU) for the service information M and the card identification number IDU to the IC card terminal 2.

The IC card terminal 2 verifies the digital signature SU(M*IDU) by use of the card public key nU and, if valid, temporarily stores it in the service information area 2M$_6$ of the memory in the telephone controller 12 together with the pieces of information IDU, nU and M. The data thus stored in the service information area 2M$_6$ is transmitted via the communication network 3 to the management center 4, for example, every week, or when the amount of data thus stored reaches a fixed value, or the IC card terminal 2 is polled by the management center 4. It is also possible to directly connect portable terminals to the IC card terminal 2 to receive and send therefrom the digital signature SU(M*IDU) to the management center 4. The management center 4 further verifies the digital signature SU(M*IDU) and records the service information M for each IC card identification number IDU, which is used for charging purpose or for making various inquiries.

It is possible to provide increased security against wire tapping through utilization of a method in which the IC card 6 and the IC card terminal 2 both have a specific key for encrypting and decrypting various pieces of information which are transmitted and received between the IC card 6 and the IC card terminal 2. Moreover, by making provision for prestoring term-of-validity information in the IC card and verifying it by a clock in the IC card terminal, it is possible to inhibit the abuse of the IC card after being lost.

With an arrangement wherein the identification number IDC of the card dispenser 5 which records initial information in the IC card, the master digital signature SA(IDC) of the management center 4 for the identification number IDC and the master public key nA for verifying the signature are prestored in the IC card at the time of issuing it and these pieces of information are transmitted to the IC card terminal 2 for verification when the IC card 6 is used, it is possible to make a check to see if the IC card 6 is a valid one issued from the valid IC card dispenser.

While in the above embodiments the user enters the password into the IC card terminal with a view to preventing the abuse of a lost IC card, the password may be omitted according to services or in accordance with user's wishes. In this instance, the process shown in FIG. 17 is performed without using the password Nc.

Further, in transmission of data to the management center 4, for example, in a practical system in which the present invention is implemented, data C which is not particularly needed may be added to data nU, IDU, SA(nU*IDU) so that a sufficient amount of data nU, IDU, C and SA(nU*IDU*C) can be transmitted to prevent abuse of a card if it is not possible to prevent an IC card from being abused by transmitting only data nU, IDU, SA(nU*IDU) or the like.

Thus, according to the embodiment of FIG. 17, since the information for specifying the IC card appended with the digital signature of the management center 4 can be verified at the IC card terminal, the management center 4 having a database concerning IC cards need not be accessed before receiving services and the use of an invalid IC card can be prevented. Moreover, the service information such as the service charge to be paid or the history of use which is used in the case of a trouble or used as a reference by the user is appended with the digital signature of the IC card and transmitted to the IC card terminal, from which the service information appended with the digital signature is transmitted to a charging center for storage therein. The service information thus stored in the center can be used as evidence in the case of dealing with a trouble.

It will be apparent that many modifications and variations may be effected without departing from the scope of the novel concepts of the present invention.

What is claimed is:

1. A password registration method for an IC card, wherein said IC card has card information memory means wherein there are written, as card information, from a management center a card identification number IDU, a predetermined setting number Ns, a fourth master digital signature SA4 for said setting number Ns, and a fifth master digital signature SA5 for information including said card identification number IDU and said fourth master digital signature SA4, and wherein an IC card terminal has terminal information memory means wherein there are written, as terminal information, from said management center a master public key nA for verifying a master digital signature, terminal secret keys pT and qT for creating a digital signature by said IC card terminal and a terminal public key nT for verifying said terminal digital signature; said method comprising:

a step wherein said IC card transmits said card identification number IDU and said fourth and fifth master digital signatures SA4 and SA5 to said IC card terminal;

a step wherein said IC card terminal verifies said fifth master digital signature SA5 and, if valid, becomes enabled for password registration processing and transmits a setting number Ns' to said IC card when it is entered;

a step wherein said IC card transmits an authentication signal to said IC card terminal when said setting number Ns' received from said IC card terminal matches said setting number Ns in said card information memory means;

a step wherein upon receiving said authentication signal, said IC card terminal becomes enabled for entering of password and creates a terminal digital signature ST for information including an entered password Nc and transmits said terminal digital signal ST to said IC card together with said password Nc and said terminal public key nT; and a step wherein said IC card verifies said terminal digital signature ST and, if valid, writes said password Nc into password memory means.

2. The method of claim 1, wherein said IC card has card secret keys pU and qU for digital signature creating use and a card public key nU prestored in said card information memory means from said management center, and which further includes:

a step wherein when said password Nc is entered, said IC card terminal generates a random number R and transmits it to said IC card;

a step wherein upon receiving said random number R, said IC card generates a random number X and creates a card digital signature SU for information including said random numbers R and X and transmits said digital signature SU to said IC card terminal together with said random number X and said card public key nU; and a step wherein said IC card terminal verifies said card digital signature SU and, if valid, creates a terminal digital signature for information including said random numbers R and X and said password Nc and sends it as a digital signature including said password Nc.

3. A method for the settlement of charges by an IC card, wherein said IC card has card information memory means wherein there written, as card information, from a management center a card identification number IDU, a predetermined setting number Ns, a fourth master digital signature SA4 for said setting number Ns and a fifth master digital signature SA5 for information including said card identification number IDU and said fourth master digital signature SA4, and wherein an IC card terminal has terminal information memory means wherein there are written, as terminal information, from said management center a master public key nA for verifying a master digital signature, terminal secret keys pT and qT for the creation of a terminal digital signature and a terminal public key nT for verifying said terminal digital signature; said method comprising:
- a step wherein said IC card transmits said card identification number IDU and said fourth and fifth master digital signatures to said IC card terminal;
- a step wherein said IC card terminal verifies said fifth master digital signature SA5 and, if valid, instructs the entering of a password and transmits a password Nc' to said IC card when it is entered;
- a step wherein said IC card matches said password Nc' with said password Nc in said card information memory means and, if they match, transmits an authentication signal to said IC card terminal; and
- a step wherein upon receiving said authentication signal, said IC card terminal becomes enabled for providing a service and, after completion of said service, records information including an amount value V for said service and said received card identification number IDU, as usage/management information, in usage/management memory means.

4. The method of claim 3, wherein said IC card has card secret keys pU and qU for the creation of a digital signature and a card public key nU prestored in said card information memory means from said management center; and which further includes:
- a step wherein when said password Nc is entered, said IC card terminal generates and transmits a random number R to said IC card;
- a step wherein upon receiving said random number R, said IC card generates a random number X and creates a card digital signature SU for information including said random numbers R and X and transmits it to said IC card terminal together with said random number X and said card public key nU; and
- a step wherein said IC card terminal verifies said card digital signature SU and, if valid, becomes enabled for providing a service, on the assumption that it has received said authentication signal.

* * * * *